United States Patent
Imamura et al.

(10) Patent No.: US 6,345,385 B2
(45) Date of Patent: Feb. 5, 2002

(54) STORAGE UNIT, STORAGE MEDIUM AND IDENTIFICATION INFORMATION RECORDING METHOD

(75) Inventors: Kiyomi Imamura, Kawasaki; Teruji Yamakawa, Kanagawa, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/138,816

(22) Filed: Aug. 21, 1998

(30) Foreign Application Priority Data

Jan. 20, 1998 (JP) .......................................... 10-008988

(51) Int. Cl.⁷ ................................................ G06F 9/45
(52) U.S. Cl. ........................ 717/11; 711/115; 713/168
(58) Field of Search ........................ 717/1, 11, 4, 115; 713/168

(56) References Cited

U.S. PATENT DOCUMENTS

| | | | | |
|---|---|---|---|---|
| 4,748,561 A | * | 5/1988 | Brown | 364/300 |
| 5,790,664 A | * | 8/1998 | Coley et al. | 380/4 |
| 5,940,854 A | | 8/1999 | Green, Jr. et al. | 711/112 |
| 6,035,403 A | * | 3/2000 | Subbiah et al. | 717/201 |

FOREIGN PATENT DOCUMENTS

| | | |
|---|---|---|
| EP | 114186 | 8/1984 |
| EP | 785547 | 7/1997 |
| JP | 60193143 | 10/1985 |
| JP | 4157556 | 5/1992 |
| JP | 5-225762 | 9/1993 |
| JP | 5-342328 | 12/1993 |
| JP | 6259938 | 9/1994 |
| JP | 6-259938 | 9/1994 |
| JP | 9-198778 | 7/1997 |

OTHER PUBLICATIONS

Hill. A Perspective: The Role of Identifiers in Managing and Protecting Intellectual Property in the Digital Age. IEEE. pp. 1228–1238, Nov. 1997.*
Schneck. Persistent Access Control to Prevent Piracy of Digital Information. IEEE. pp. 1239–1250, Jul. 1999.*

* cited by examiner

Primary Examiner—Mark R. Powell
Assistant Examiner—Wei Zhen
(74) Attorney, Agent, or Firm—Greer, Burns & Crain, Ltd.

(57) ABSTRACT

A storage unit for recording on a portable recording medium identification information which is peculiar to the portable recording medium, includes a number generation part for generating a firmware management number based on a version number of a firmware of the storage unit and a number of times the firmware is installed in past in the storage unit and other storage units, an information generation part for generating the identification information based on at least a medium generation consecutive number which indicates a number of times the identification information is recorded on portable recording mediums and the firmware management number, and a recording part for recording the identification information on the portable recording medium.

33 Claims, 18 Drawing Sheets

STORAGE UNIT, STORAGE MEDIUM AND IDENTIFICATION INFORMATION RECORDING METHOD

BACKGROUND OF THE INVENTION

The present invention generally relates to storage units, storage mediums and identification information recording methods, and more particularly to a storage unit which records on a portable recording medium identification information peculiar to the portable recording medium, a computer readable storage medium which stores a program for making a computer record such identification information on the portable recording medium, and an identification information recording method for recording the identification information on the portable recording medium.

In order to prevent unauthorized copying of software, there is a technique to permit operation of the software only on a specific computer. For example, a key is paired with the software, and the unauthorized copy of this software is prevented by confirming the existence of the key during operation of this software. However, according to this technique, an independent key is necessary for each software, and this technique is thus not suited for a case where a large number of software is used.

On the other hand, a technique using information which specifies each computer as the key has been proposed. For example, a unit ID information which differs for each computer, even among computers of the same kind, is prerecorded in the software when installing the software or when shipping the software. According to this proposed technique, the unit ID information is read during operation of the software, and the use of the software is permitted only when the read unit ID information matches the unit ID information prerecorded in the software, so as to prevent unauthorized copying of the software.

However, the following inconvenience occurs if the software is recorded on a portable recording medium according to the proposed technique described above. In other words, it is not uncommon to record the software on a portable recording medium having a large capacity, but the portable recording medium in this case is not an unauthorized copy, and it should be able to operate the software recorded on the portable recording medium on any computer of the same kind. However, when the proposed technique described above is employed, the portable recording medium will be recognized as an unauthorized copy on computers other than the registered computer, and the software will not operate on computers other than the registered computer.

The above described inconvenience can be eliminated by providing a means for specifying the portable recording medium itself. For example, each portable recording medium itself can be specified by adding a different medium ID on each portable recording medium by carrying out an irreversible recording by a stamper or the like at a production stage of the portable recording medium. However, according to this method, an additional process is required to add the medium ID with respect to the portable recording medium which is already completed and inspected, thereby complicating the production process and also increasing the production cost. In addition, this method cannot add the medium ID on an existing portable recording medium.

On the other hand, the following advantageous effects can be obtained when the medium ID is added to the portable recording medium.

The contents stored in the portable recording medium can easily be copied. For this reason, the contents of an original portable recording medium which stores an important document such as a contract can be copied completely to a copy storage recording medium, and the contents of this copy storage recording medium can be modified in part. In such a case, even if a modification of the contents of the original portable recording medium is made impossible, the contents of the copy storage recording medium can easily be modified. Accordingly, when the contents of the copy portable recording medium are modified, there is no means of knowing which portable recording medium is the original and which is the copy. However, when the medium ID is added to each portable recording medium, it is always possible to know which portable recording medium is the original and which is the copy.

In addition, when recording software or data on the portable recording medium, the medium ID can also be recorded as a key which is used when making a reference to the contents of the portable recording medium. In this case, when the medium ID of the portable recording medium itself and the medium ID which is recorded as the key when recording the software or the data on the portable recording medium do not match, the contents of the portable recording medium cannot be read. For this reason, when a portable recording medium recorded with a database, for example, is rented, the borrower can only read the database from the borrowed portable recording medium. Even if the borrower copies the database read from the borrowed portable recording medium onto another storage unit, the medium ID which is recorded as the key to the database will not match the medium ID of this other storage unit when an attempt is made to read the database from this other storage unit, and it is impossible to make a reference to the database copied to this other storage unit. As a result, the unauthorized use of the contents recorded on the portable recording medium can positively be prevented.

Furthermore, when the medium ID is added to the portable recording medium, the medium ID can also be used as management information of the portable recording medium. In other words, when the portable recording medium is lost or stolen, it is possible to read the medium ID from the portable recording medium when the portable recording medium is found, and from the read medium ID, it is possible to specify the owner of the portable recording medium when the medium ID managed by the owner is known.

As described above, when the medium ID is added to the portable recording medium, various advantageous effects can be obtained. But on the other hand, the method of adding the different medium ID on each portable recording medium by carrying out the irreversible recording by the stamper or the like at the production stage of the portable recording medium leads to the necessity to additionally provide the process of adding the medium ID with respect to the portable recording medium which is already completed and inspected. Consequently, there were problems in that the production process became complicated and the production cost became high. In addition, there was another problem in that this method cannot add the medium ID on the existing portable recording medium.

On the other hand, a method of recording a medium ID in a reserved region of the portable recording medium was proposed in a Japanese Laid-Open Patent Application No.9-198778, for example. The medium ID is generated based on a consecutive number which is assigned to each medium drive, and the medium ID is recorded in the reserved region if the medium ID is not recorded in the reserved region of the portable recording medium. According to this proposed method, it is possible to add the medium ID on the existing portable recording medium because this proposed method does not carry out an irreversible recording by use of a stamper or the like at the production stage of the portable recording medium. However, since this proposed method generates the medium ID based on the consecutive number which is assigned to each medium drive, there was a problem in that the management of the medium IDs and the management of the portable recording mediums become complicated and troublesome to perform, because the medium IDs which are generated may become inconsistent even for the same user. That is, the medium drive of the user may break down, and a substitute medium drive may be used while the broken medium drive is being repaired. In addition, the medium drive may be damaged and replaced by a new medium drive. In such cases, the consecutive number assigned to the substitute or new medium drive becomes different from the consecutive number assigned to the original medium drive, and even though the user is the same, the medium IDs generated when the original medium drive was used and the medium IDs generated when the substitute or new medium drive is used become inconsistent.

SUMMARY OF THE INVENTION

Accordingly, it is a general object of the present invention to provide a novel and useful storage unit, storage medium and identification information recording method, in which the problems described above are eliminated.

Another and more specific object of the present invention is to provide a storage unit, storage medium and identification information recording method which are capable of recording identification information on a portable recording medium so that management of the identification information and management of the portable recording medium are facilitated.

Still another object of the present invention is to provide a storage unit for recording on a portable recording medium identification information which is peculiar to the portable recording medium, comprising number generation means for generating a firmware management number based on a version number of a firmware of the storage unit and a number of times the firmware is installed in past in the storage unit and other storage units, information generation means for generating the identification information based on at least a medium generation consecutive number which indicates a number of times the identification information is recorded on portable recording mediums and the firmware management number, and recording means for recording the identification information on the portable recording medium. According to the storage unit of the present invention, the identification information is not generated based on a consecutive number which is assigned to each medium drive. The present invention generates the identification information based on the firmware management number and the medium generation consecutive number or the timer value, and thus, consistency of the generated identification information is maintained with respect to the same user, even if the medium drive breaks down and is replaced by a substitute drive or the medium drive is damaged and is replaced by new medium drive and the consecutive number assigned to the substitute or new medium drive is different from the original medium drive. Therefore, the identification information and the portable recording medium can both be managed with ease, and the identification information can be recorded on the portable recording medium so that the tracking or investigation of the portable recording medium is facilitated when a failure or the like is generated.

A further object of the present invention is to provide a storage unit for recording on a portable recording medium identification information which is peculiar to the portable recording medium, comprising number generation means for generating a firmware management number based on a version number of a firmware of the storage unit and a number of times the firmware is installed in past in the storage unit and other storage units, information generation means for generating the identification information based on at least time information which indicates a time when the portable recording medium is created and the firmware management number, and recording means for recording the identification information on the portable recording medium. According to the storage unit of the present invention, the identification information is not generated based on a consecutive number which is assigned to each medium drive. The present invention generates the identification information based on the firmware management number and the medium generation consecutive number or the timer value, and thus, consistency of the generated identification information is maintained with respect to the same user, even if the medium drive breaks down and is replaced by a substitute drive or the medium drive is damaged and is replaced by new medium drive and the consecutive number assigned to the substitute or new medium drive is different from the original medium drive. Therefore, the identification information and the portable recording medium can both be managed with ease, and the identification information can be recorded on the portable recording medium so that the tracking or investigation of the portable recording medium is facilitated when a failure or the like is generated.

Another object of the present invention is to provide a computer readable storage medium which stores a program for causing a computer to record on a portable recording medium identification information which is peculiar to the portable recording medium, comprising number generation means for causing the computer generate a firmware management number based on a version number of a firmware of the computer and a number of times the firmware is installed in past in the computer and other computers, information generation means for causing the computer to generate the identification information based on at least a medium generation consecutive number which indicates a number of times the identification information is recorded on portable recording mediums and the firmware management number, and recording means for causing the computer to record the identification information on the portable recording medium. According to the storage medium of the present invention, the identification information is not generated based on a consecutive number which is assigned to each medium drive. The present invention generates the identification information based on the firmware management number and the medium generation consecutive number or the timer value, and thus, consistency of the generated identification information is maintained with respect to the same user, even if the medium drive breaks down and is replaced by a substitute drive or the medium drive is damaged and is replaced by new medium drive and the consecutive number assigned to the substitute or new medium drive is different from the original medium drive. Therefore, the identification information and the portable recording medium can both be managed with ease, and the identification information can be recorded on the portable recording medium so that the tracking or investigation of the portable recording medium is facilitated when a failure or the like is generated.

Still another object of the present invention is to provide a computer readable storage medium which stores a program for causing a computer to record on a portable recording medium identification information which is peculiar to the portable recording medium, comprising number generation means for causing the computer to generate a firmware management number based on a version number of a firmware of the computer and a number of times the firmware is installed in past in the computer and other computers, information-generation means for causing the computer to generate the identification information based on at least time information which indicates a time when the portable recording medium is created and the firmware management number, and recording means for causing the computer to record the identification information on the portable recording medium. According to the storage medium of the present invention, the identification information is not generated based on a consecutive number which is assigned to each medium drive. The present invention generates the identification information based on the firmware management number and the medium generation consecutive number or the timer value, and thus, consistency of the generated identification information is maintained with respect to the same user, even if the medium drive breaks down and is replaced by a substitute drive or the medium drive is damaged and is replaced by new medium drive and the consecutive number assigned to the substitute or new medium drive is different from the original medium drive. Therefore, the identification information and the portable recording medium can both be managed with ease, and the identification information can be recorded on the portable recording medium so that the tracking or investigation of the portable recording medium is facilitated when a failure or the like is generated.

A further object of the present invention is to provide an identification information recording method for recording on a portable recording medium used by a computer identification information which is peculiar to the portable recording medium, comprising a number generation step generating a firmware management number based on a version number of a firmware of the computer and a number of times the firmware is installed in past in the computer and other computers, an information generation step generating the identification information based on at least a medium generation consecutive number which indicates a number of times the identification information is recorded on portable recording mediums and the firmware management number, and a recording step recording the identification information on the portable recording medium. According to the identification information recording method of the present invention, the identification information is not generated based on a consecutive number which is assigned to each medium drive. The present invention generates the identification information based on the firmware management number and the medium generation consecutive number or the timer value, and thus, consistency of the generated identification information is maintained with respect to the same user, even if the medium drive breaks down and is replaced by a substitute drive or the medium drive is damaged and is replaced by new medium drive and the consecutive number assigned to the substitute or new medium drive is different from the original medium drive. Therefore, the identification information and the portable recording medium can both be managed with ease, and the identification information can be recorded on the portable recording medium so that the tracking or investigation of the portable recording medium is facilitated when a failure or the like is generated.

Another object of the present invention is to provide an identification information recording method for recording on a portable recording medium used by a computer identification information which is peculiar to the portable recording medium, comprising a number generation step generating a firmware management number based on a version number of a firmware of the computer and a number of times the firmware is installed in past in the computer and other computers, an information generation step generating the identification information based on at least time information which indicates a time when the portable recording medium is created and the firmware management number, and a recording step recording the identification information on the portable recording medium. According to the identification information recording method of the present invention, the identification information is not generated based on a consecutive number which is assigned to each medium drive. The present invention generates the identification information based on the firmware management number and the medium generation consecutive number or the timer value, and thus, consistency of the generated identification information is maintained with respect to the same user, even if the medium drive breaks down and is replaced by a substitute drive or the medium drive is damaged and is replaced by new medium drive and the consecutive number assigned to the substitute or new medium drive is different from the original medium drive. Therefore, the identification information and the portable recording medium can both be managed with ease, and the identification information can be recorded on the portable recording medium so that the tracking or investigation of the portable recording medium is facilitated when a failure or the like is generated.

Other objects and further features of the present invention will be apparent from the following detailed description when read in conjunction with the accompanying drawings.

DETAILED DESCRIPTION OF THE PREFERRED EMBODIMENTS

Figure 1:
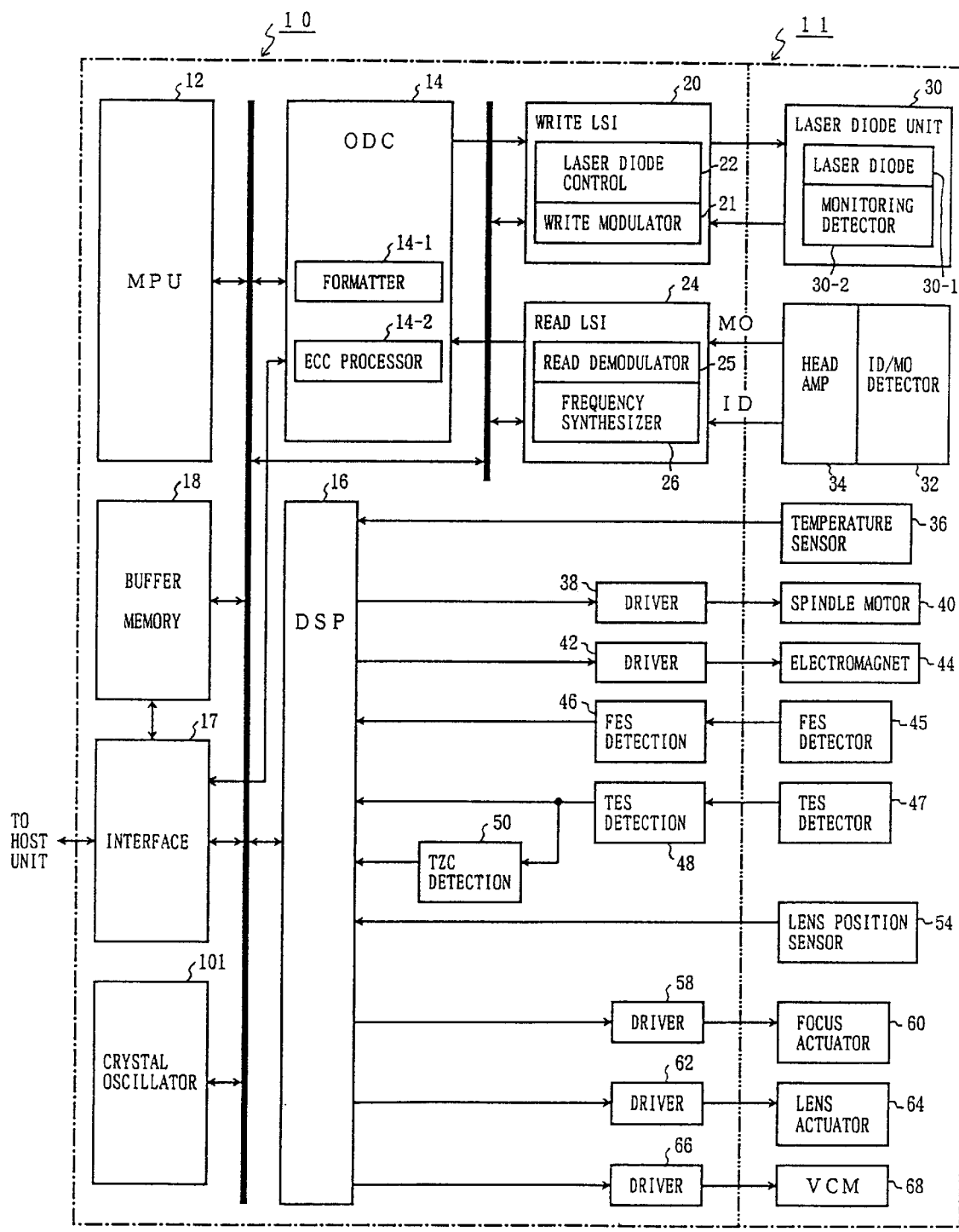
FIG. 1 is a system block diagram showing the general construction of an embodiment of a storage unit according to the present invention.

A description will be given of an embodiment of a storage unit according to the present invention, by referring to FIGS. 1 through 3. FIG. 1 is a system block diagram showing the general construction of this embodiment of the storage unit. In this embodiment of the storage unit, the present invention is applied to an optical disk unit.

As shown in FIG. 1, the optical disk unit generally includes a control unit 10 and an enclosure 11. The control unit 10 includes a microprocessor unit (MPU) 12 which generally controls the operation of the optical disk unit, an interface 17 which exchanges commands and data between a host unit (not shown), an optical disk controller (ODC) 14 which carries out processes required to read/write data with respect to an optical disk (not shown), a digital signal processor (DSP) 16, and a buffer memory 18. The buffer memory 18 is used in common by the MPU 12, the ODC 14 and the interface 17, and includes a dynamic random access memory (DRAM), for example. A crystal oscillator 101 is coupled to the MPU 12.

The ODC 14 includes a formatter 14-1 and error correction code (ECC) processor 14-2. At the time of a write access, the formatter 14-1 divides NRZ write data into sector units of the optical disk and generates a recording format, and the ECC processor 14-2 generates and adds an ECC with respect to sector write data units and also generates and adds if necessary a cyclic redundancy check (CRC) code. Further, the ECC processor 14-2 converts the sector data with the encoded ECC into a 1–7 run length limited (RLL) code, for example.

At the time of a read access, a reverse conversion of the 1–7 RLL is carried out with respect to the sector data, and after carrying out the CRC, the error detection and error correction using the ECC are carried out in the ECC processor 14-2. Further, the NRZ data in sector units are connected in the formatter 14-2 so as to transfer a NRZ read data stream to the host unit.

A write large scale integrated (LSI) circuit 20 is provided with respect to the ODC 14. This write LSI circuit 20 includes a write modulator 21 and a laser diode control circuit 22. A control output of the laser diode control circuit 22 is supplied to a laser diode unit 30 which is provided in an optical unit of the enclosure 11. The laser diode unit 30 integrally includes a laser diode 30-1 and a monitoring detector 30-2. The write modulator 21 converts the write data into the data format of the pit position modulation (PPM) recording (or mark recording) or, a pulse width modulation (PWM) recording (or edge recording).

When recording and reproducing data with respect to the optical disk using the laser diode unit 30, this embodiment can use any one of writable magneto-optic (MO) cartridge mediums having the storage capacities of 128 MB, 230 MB, 540 MB and 640 MB. In the MO cartridge mediums having the storage capacities of 128 MB and 230 MB, the PPM recording is employed to record the data in correspondence with the existence and non-existence of marks on the optical disk. In addition, a zone constant angular velocity (CAV) is used as the recording format of the optical disk, where 1 zone is provided as a user region in the case of the optical disk having the storage capacity of 128 MB and 10 zones are provided as the user region in the case of the optical disk having the storage capacity of 230 MB.

In the MO cartridge mediums having the storage capacities of 540 MB and 640 MB and used for the high density recording, the PWM recording is employed to record the data in correspondence with the edges of the marks, that is, leading and trailing edges, on the optical disk. The difference between the storage capacities of the optical disk having the storage capacity of 540 MB and the optical disk having the storage capacity of 640 MB is due to the different sector capacities. The optical disk has the storage capacity of 540 MB if the sector capacity is 512 bytes, and the optical disk has the storage capacity of 640 MB if the sector capacity is 2048 bytes. In addition, the zone CAV is used as the recording format of the optical disk, where 18 zones are provided as the user region in the case of the optical disk having the storage capacity of 540 MB and 11 zones are provided as the user region in the case of the optical disk having the storage capacity of 640 MB.

Hence, this embodiment can cope with the optical disks having the storage capacities of 128 MB, 230 MB, 540 MB and 640 MB, and also cope with direct overwrite type optical disks having the storage capacities of 540 MB and 640 MB. Accordingly, when the optical disk is loaded into the optical disk unit, an identification (ID) part of the optical disk is first read so as to recognize the type of the optical disk by the MPU 12 from the intervals of the pits, and a recognition result of the type of loaded optical disk is notified to the ODC 14.

A read LSI circuit 24 is provided as a read system with respect to the ODC 14. A read demodulator 25 and a frequency synthesizer 26 are provided in the read LSI circuit 24. An ID/MO detector 32 of the enclosure 11 detects a laser beam emitted from the laser diode 30-1 and returned via the optical disk, and a detection signal from this ID/MO detector 32 is input as an ID signal and a MOD signal to the read LSI circuit 24 via a head amplifier 34.

The read demodulator 25 of the read LSI circuit 24 includes the functions of circuits such as an automatic gain control (AGC) circuit, a filter and a sector mark detection circuit. Hence, the read demodulator 25 generates a read clock and read data from the input ID signal and MO signal, and demodulates the PPM data or the PWM data back into the original NRZ data. In addition, since the zone CAV is employed, the MPU 12 controls a setting of a frequency dividing ratio with respect to the frequency synthesizer 26 of the read LSI circuit 24 in order to generate a clock frequency in correspondence with the zone.

The frequency synthesizer 26 is a phase locked loop (PLL) circuit having a programmable frequency divider, and generates as a read clock a reference clock having a predetermined specific frequency depending on the zone position on the optical disk. In other words, the frequency synthesizer 26 is formed by the PLL circuit having the programmable frequency divider, and generates the reference clock having a frequency fo based on fo=(m/n)·fi according to a frequency dividing ratio m/n which is set by the MPU 12 depending on a zone number.

A denominator n of the frequency dividing ratio m/n is a specific value depending on the type of optical disk having the storage capacity of 128 MB, 230 MB, 540 MB or 640 MB. In addition, a numerator m of the frequency dividing ratio m/n is a value which changes depending on the zone position on the optical disk, and table information of the values corresponding to the zone numbers are prepared in advance with respect to each type of optical disk. Moreover, fi denotes a reference clock frequency generated outside the frequency synthesizer 26.

The read data demodulated in the read LSI circuit 24 is supplied to the read system of the ODC 14, and after carrying out the reverse conversion of the 1–7 RLL, the CRC and the ECC processes are carried out by the encoding function of the ECC processor 14-2 so as to restore the original NRZ data. Next, the formatter 14-1 connects and converts the NRZ sector data into the NRZ read data stream, and this NRZ read data stream is transferred to the host unit via the buffer memory 18 and the interface 17.

A detection signal from a temperature sensor 36 provided in the enclosure 11 is supplied with respect to the MPU 12 via the DSP 16. Based on an environmental temperature within the optical disk unit detected by the temperature sensor 36, the MPU 12 controls the light emission powers for the read, write and erase in the laser diode control circuit 22.

The MPU 12 controls a spindle motor 40 provided in the enclosure 11 via the DSP 16 and a driver 38. In this embodiment, since the zone CAV is employed as the recording format of the optical disk, the spindle motor 40 is rotated at a constant speed of 3000 rpm, for example.

In addition, the MPU 12 controls an electromagnet 44 provided in the enclosure 11 via the DSP 16 and a driver 42. The electromagnet 44 is arranged on a side opposite to the side of the optical disk on which the laser beam is irradiated within the optical disk unit which is loaded with this optical disk. This electromagnet 44 supplies an external magnetic field on the optical disk at the time of the recording and erasure.

The DSP 16 is provided with a servo function for positioning the laser beam from the laser diode 30-1 with respect to the optical disk, and functions as a seek controller and an on-track controller which enable the laser beam to seek a target track and to be positioned on the target track. The seek control and the on-track control may be carried out simultaneously in parallel with the write access or the read access of the MPU 12 with respect to a host command.

In order to realize the servo function of the DSP 16, a focus error signal (FES) detector 45 is rovided in the optical unit of the enclosure 11 so as to detect the laser beam emitted from the laser diode 30-1 and returned via the optical disk. A FES detection circuit 46 generates a FES E1 from a detection signal received from the FES detector 45, and inputs this FES E1 to the DSP 16.

A tracking error signal (TES) detector 47 is also provided in the optical unit of the enclosure 11 so as to detect the laser beam emitted from the laser diode 30-1 and returned via the optical disk. A TES detection circuit 48 generates a TES E2 from a detection signal received from the TES detector 47, and inputs this TES E2 to the DSP 16. The TES E2 is also input to a track zero crossing (TZC) detection circuit 50, and this TZC detection circuit 50 generates a TZC signal E3 which is input to the DSP 16.

A lens position sensor 52 is provided in the enclosure 11. This lens position sensor 52 detects a position of an objective lens through which the laser beam is irradiated on the optical disk. A lens position detection signal (LPOS) E4 from the lens position sensor 52 is input to the DSP 16. The DSP 16 controls and drives a focus actuator 60, a lens actuator 64 and a voice coil motor (VCM) 68 via corresponding drivers 58, 62 and 66, so as to control the position of a beam spot formed by the laser beam on the optical disk.

Figure 2:
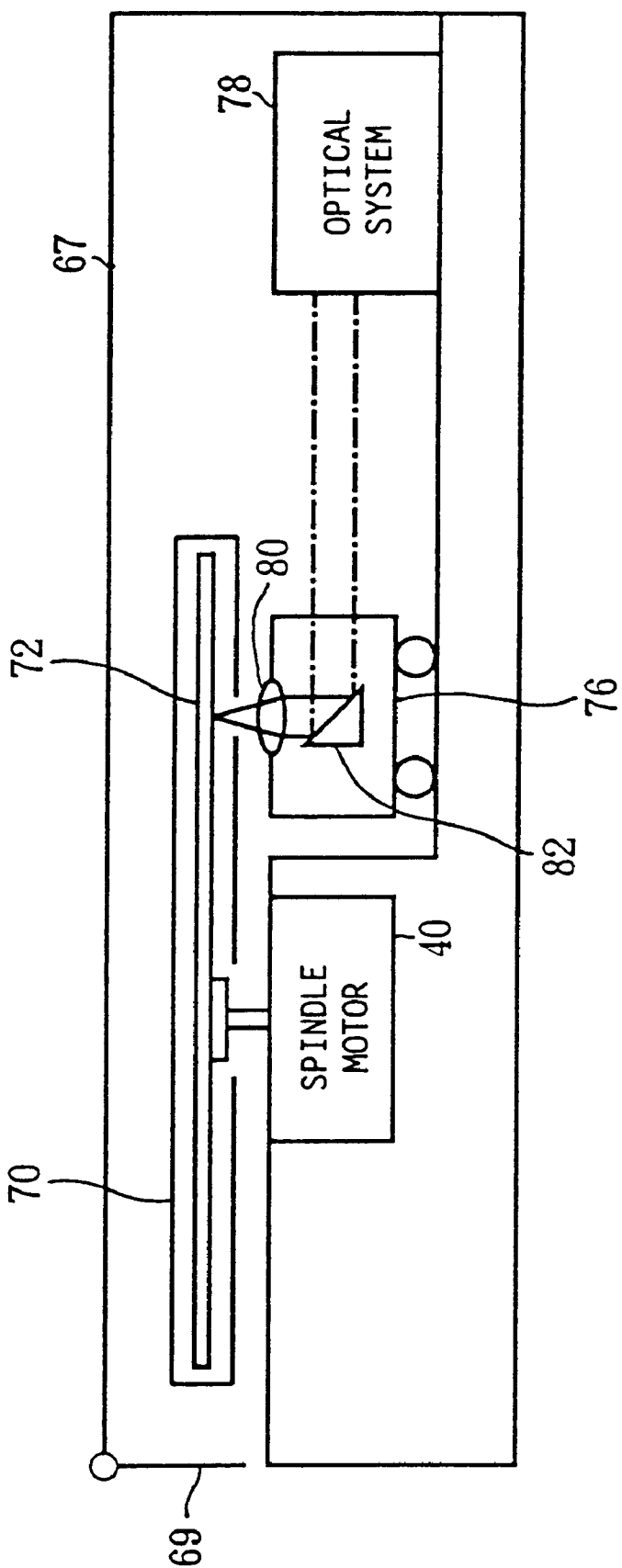
FIG. 2 is a cross sectional view showing the general construction of an enclosure.

FIG. 2 is a cross sectional view showing the general construction of the enclosure 11. As shown in FIG. 2, the spindle motor 40 is provided within a housing 67. By inserting a MO cartridge 70 into the housing 67 from the side of an inlet door 69, an optical disk (MO disk) 72 accommodated within the MO cartridge 70 engages a rotary shaft of the spindle motor 40, thereby loading the optical disk 72 with respect to the optical disk unit.

A carriage 76 is provided below loaded the optical disk 72 within the MO cartridge 70. This carriage 76 is freely movable in a direction which traverses tracks on the optical disk 72 when driven by the VCM 64. An objective lens 80 is mounted on the carriage 76. The laser beam emitted from the laser diode 30-1 which is provided within a fixed optical system 78 is reflected by a mirror 82, and is irradiated on the recording surface of the optical disk 72 via the objective lens 80, thereby forming a beam spot on the recording surface.

The movement of the objective lens 80 along an optical axis is controlled by the focus actuator 60 of the enclosure 11 shown in FIG. 1. In addition, the objective lens 80 is movable in a radial direction which traverses the tracks on the optical disk 72 by the lens actuator 64, within a range of several tens of tracks. The position of the objective lens 80 mounted on the carriage 76 is detected by the lens position sensor 54 shown in FIG. 1. The lens position sensor 54 outputs the lens position detection signal E4 which takes a value zero at a neutral position where the optical axis of the objective lens 80 is perpendicular to the recording surface of the optical disk 72, and has a magnitude and a polarity depending on the amount the optical axis of the objective lens 80 moves towards the inner or outer peripheral side of the optical disk 72.

Figure 3:
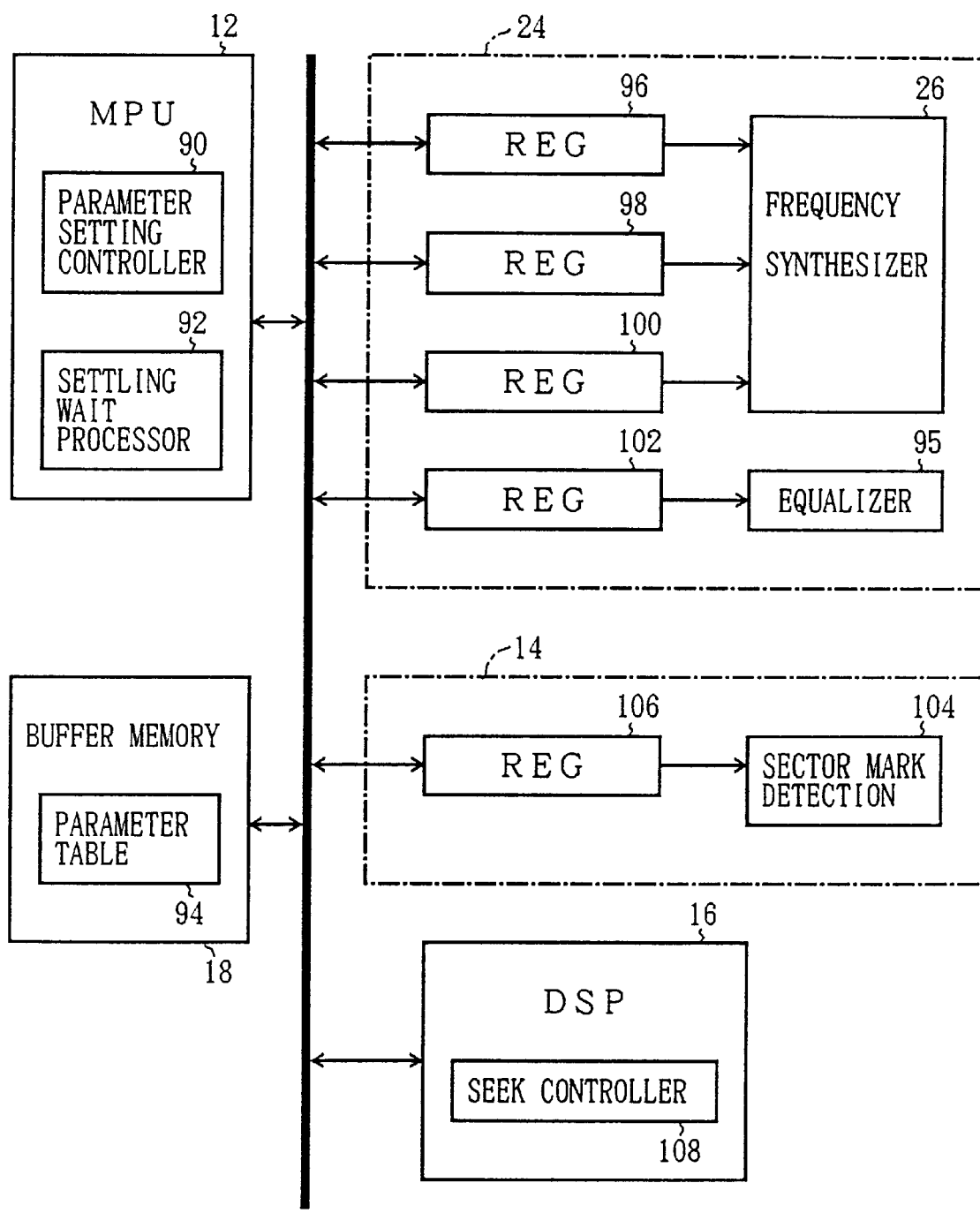
FIG. 3 is a system block diagram for explaining parameter setting control and settling wait functions with respect to a read LSI, ODC and DSP of a MPU in an optical disk unit.

FIG. 3 is a system block diagram for explaining the parameter setting control and settling wait functions of the MPU 12 of the optical disk unit shown in FIG. 1 with respect to the read LSI circuit 24, the ODC 14 and the DSP 16.

The MPU 12 includes a parameter setting controller 90 which operates based on a read command from the host unit, and a settling wait processor 92 for waiting the settling after the parameter setting. The parameter setting controller 90 controls the setting of the parameters which are required to make various kinds of accesses by use of a parameter table 94 which is developed in a RAM or the like included in the buffer memory 18.

Elements the parameters of which are to be set by the parameter setting controller 90 of the MPU 12 include the frequency synthesizer 26 and an equalizer circuit 95 within the read LSI circuit 24. The equalizer circuit 95 is provided with respect to the MO signal which is obtained from the ID/MO detector 32. In this embodiment, 3 control registers 96, 98 and 100 are provided with respect to the frequency synthesizer 26.

The parameters related to the frequency dividing ratio m/n, the frequency setting of a voltage controller oscillator (VCO) and the selection of a PLL damping resistance are respectively set in the control registers 96, 98 and 100 by the parameter setting controller 90 of the MPU 12. A control register 102 is provided with respect to the equalizer circuit 95. Parameters related to an equalizer cutoff frequency are set in the control register 102 by the parameter setting controller 90 of the MPU 12. Furthermore, a control register 106 is provided with respect to a sector mark detection circuit 104 of the ODC 14. Parameters related to a sector mark detection cutoff frequency are set in the control register 106 by the parameter setting controller 90 of the MPU 12.

A seek command is transferred to the DSP 16 when the MPU 12 executes a read command from the host unit. The DSP 16 is provided with a seek controller 108. Based on the seek command, the seek controller 108 of the DSP 16 carries out a seek control for positioning the beam spot to a target track on the optical disk 72 simultaneously in parallel with the process of the MPU 12.

Therefore, the parameter setting controller 90 of the MPU 12 can optimize the cutoff frequency of the MO signal equalizer circuit 95 within the read LSI circuit 24 by controlling the setting of the control register 102. In addition, the parameter setting controller 90 can optimize the frequency dividing ratio m/n, the VCO frequency setting and the PLL damping resistance selection of the frequency synthesizer 26 within the read LSI circuit 24 by controlling the setting of the control registers 96, 98 and 100. Furthermore, the parameter setting controller 90 can optimize the cutoff frequency of the sector mark detection circuit 104 within the ODC 14 by controlling the setting of the control register 106.

The firmware of the control unit 10 is installed, for example, by reading the firmware from the optical disk 72 inserted into the enclosure 11 and storing the firmware in the buffer memory 18 under the control of the host unit, and the firmware stored in the buffer memory 18 is executed. In addition, programs executed by the MPU 12 are similarly read from the optical disk 72 inserted into the enclosure 11 and stored in the buffer memory 18 by the MPU 12 under the control of the host unit, for example, and the programs stored in the buffer memory 18 are executed. In other words, The programs of the MPU 12 for realizing an identification information recording method according to the present invention may be recorded on a storage medium according to the present invention, and in this case, the storage medium according to the present invention is not limited to the optical disk 72. The storage medium according to the present invention may be made selected from various kinds of disks including magnetic disks, various kinds of semiconductor memory devices, various kinds of memory cards, and the like.

When installing the firmware, a version number of the firmware is stored in a version number memory within the buffer memory 18 by a known means. In addition, a number of times this firmware is installed in the past in the storage unit shown in FIG. 1 and in other storage units is stored in a version number counter within the buffer memory 18.

In addition, the storage unit according to the present invention is not limited to the construction shown in FIGS. 1 through 3, and the storage unit may have any construction as long as the version number of the firmware is stored in the version number memory within the storage unit, and the number of times the firmware is installed in the past in the storage unit and in other storage units is stored in the version number counter within the storage unit, when installing the firmware.

Figure 4:
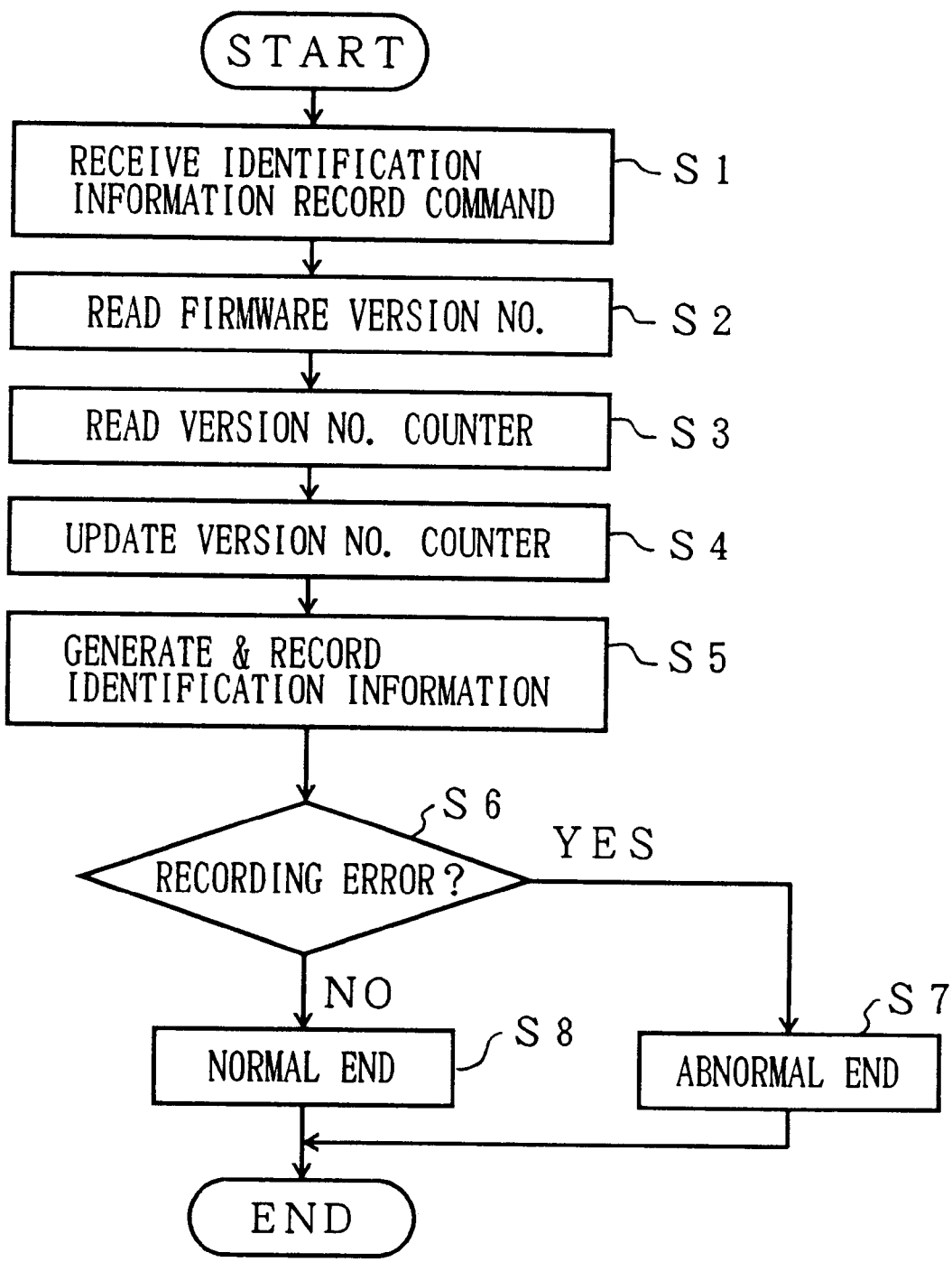
FIG. 4 is a flow chart for explaining a first embodiment of an identification information recording method according to the present invention.

Next, a description will be given of a first embodiment of the identification information recording method according to the present invention, by referring to FIG. 4. FIG. 4 is a flow chart for explaining the first embodiment of the identification information recording method. The flow charts shown in FIG. 4 and subsequent figures respectively correspond to the operation of the MPU 12 shown in FIG. 1. In the following description, it is assumed for the sake of convenience that a process of recording a medium identification information (hereinafter simply referred to as identification information) peculiar to a portable recording medium is carried out in a state where the optical disk 72 is loaded as the portable recording medium.

In FIG. 4, a step S1 receives an identification information record command from the host unit, and a step S2 reads from the version number memory the version number of the firmware which is installed in the storage unit. A step S3 reads from the version number counter the number of times this firmware is installed in the past in the storage unit and other storage units. A step S4 updates a counted value of a medium generation consecutive number counter within the buffer memory 18, for example. This medium generation consecutive number counter counts a medium generation consecutive number which indicates the number of portable recording mediums on which identification information has been recorded.

A step S5 generates a firmware management number by carrying out an operation such as an addition based on the version number read from the version number memory and the number read from the version number counter, and generates the identification information by carrying out an operation such as an addition based on this firmware management number and the medium generation consecutive number indicated by the counted value of the medium generation consecutive number counter. In addition, the step S5 records, by a known means, the generated identification information in a user area or outside the user area of the optical disk 72 which is used as the portable recording medium. For example, the identification information may be recorded in a free region which is within the user area and is not rewritable after being written, a free region which is within the user area and is rewritable or, a free region which is outside the user area and is not rewritable after being written. However, in order to positively prevent erroneous erasure of the identification information, it is desirable to record the identification information in a free region which cannot be rewritten during formatting of the optical disk 72 or, in a free region which cannot be rewritten after being written.

A zone position on the optical disk 72 where the identification information is written is determined in advance and stored in the buffer 18. Hence, when writing the identification information, it is possible to record the identification information at the predetermined zone position on the optical disk 72 by making a seek to the zone position read from the buffer memory 18. On the other hand, when reading the identification information, it is possible to reproduce the identification information from the predetermined zone position on the optical disk 72 by making a seek to the zone position read from the buffer memory 18.

A step S6 decides whether or not an error is generated while recording the identification information on the optical disk 72. If the decision result in the step S6 is YES, a step S7 notifies an abnormal end of the recording process to the host unit, and the process ends. On the other hand, if the decision result in the step S6 is NO, a step S8 notifies a normal end to the host unit, and the process ends.

Of course, the operation which is carried out when generating the firmware management number and the operation which is carried out when generating the identification information are not limited to the addition, and other operations such as a subtraction may be carried out. In addition, the operation which is carried out when generating the firmware management number and the operation which is carried out when generating the identification information need not be the same, and for example, one operation may be an addition and the other operation may be a subtraction.

Figure 5:
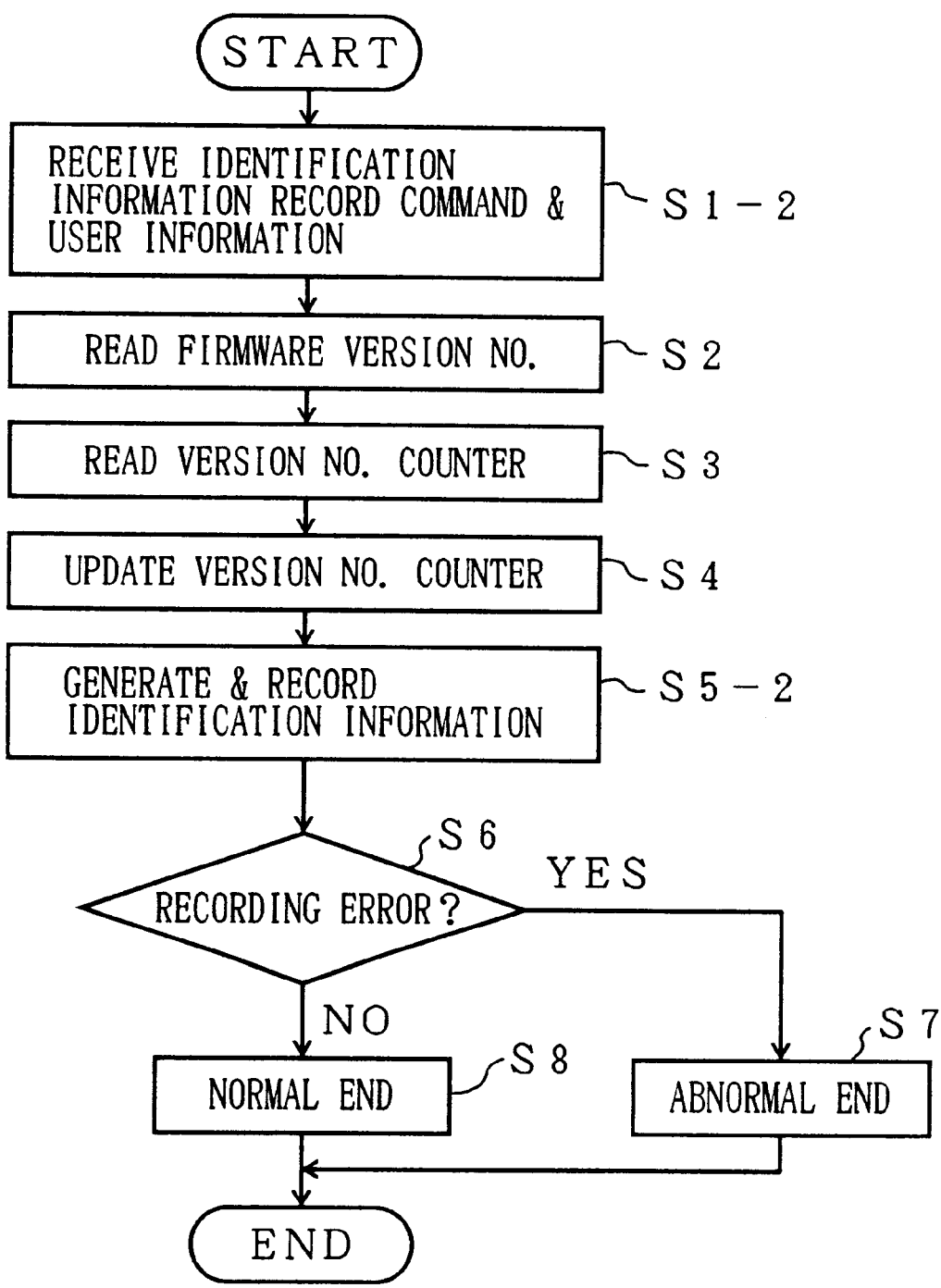
FIG. 5 is a flow chart for explaining a second embodiment of the identification information recording method according to the present invention.

Next, a description will be given of a second embodiment of the identification information recording method according to the present invention, by referring to FIG. 5. FIG. 5 is a flow chart for explaining the second embodiment of the identification information recording method. In FIG. 5, those steps which are the same as those corresponding steps in FIG. 4 are designated by the same reference numerals, and a description thereof will be omitted.

In FIG. 5, a step S1-2 receives user information in addition to receiving the identification information record command from the host unit. The user information may be input in advance by the user and stored in the buffer memory 18, for example, or the user information may be input when issuing the identification information record command from the host unit. In the former case, the user information is received by reading the user information from the buffer memory 18. On the other hand, in the latter case, the user information is received from the host unit together with the identification information record command.

A step S5-2 generates the firmware management number by carrying out an operation such as an addition based on the version number read from the version number memory and the number read from the version number counter, and generates the identification information by carrying out an operation such as an addition based on this firmware management number, the user information and the medium generation consecutive number indicated by the counted value of the medium generation consecutive number counter. In addition, the step S5-2 records, by a known method, the generated identification information in the user area or outside the user area of the optical disk 72 which is used as the portable recording medium.

Of course, the operation which is carried out when generating the firmware management number and the operation which is carried out when generating the identification information are not limited to the addition, and other operations such as a subtraction may be carried out. In addition, the operation which is carried out when generating the firmware management number and the operation which is carried out when generating the identification information need not be the same, and for example, one operation may be an addition and the other operation may be a subtraction.

Figure 6:
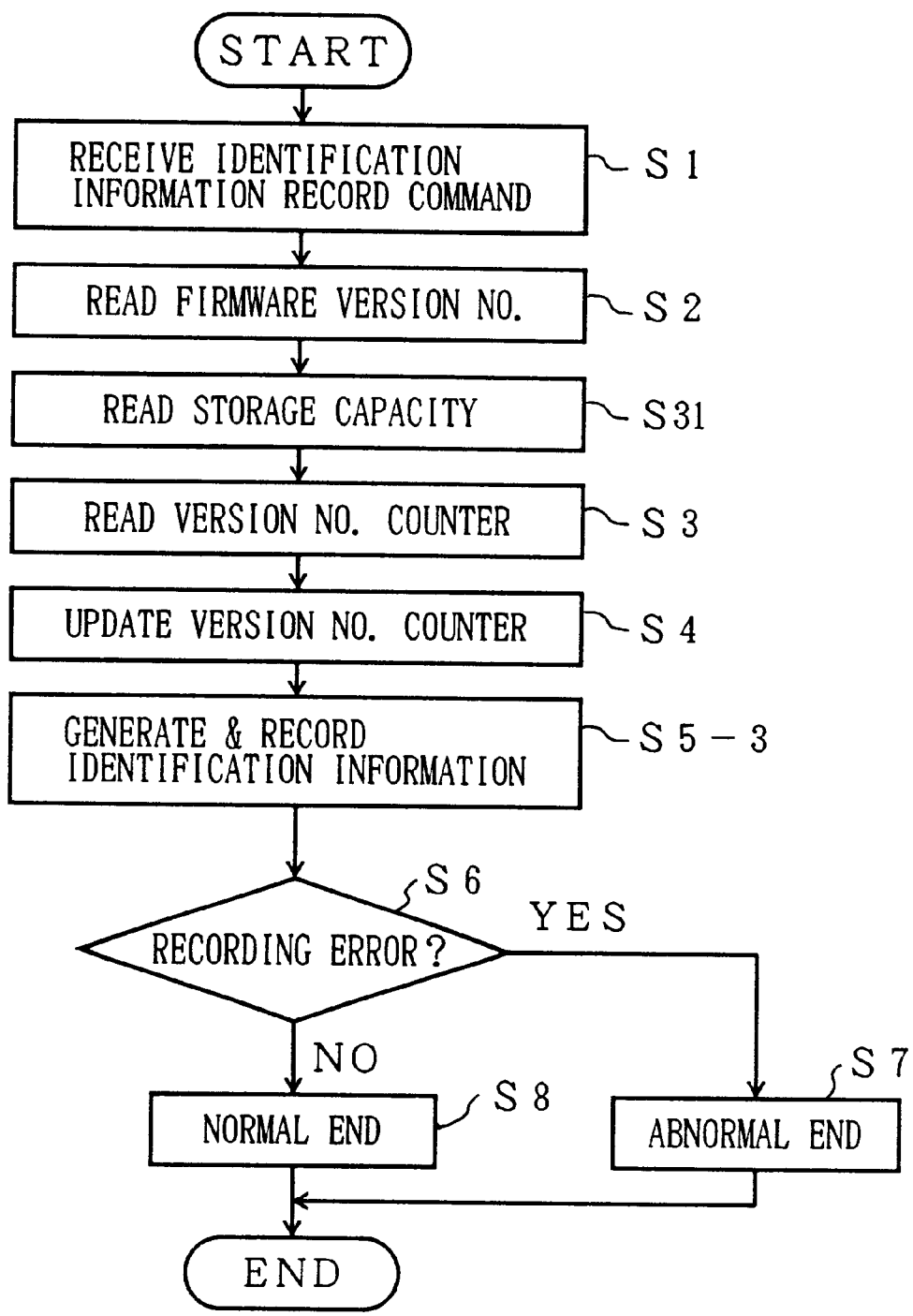
FIG. 6 is a flow chart for explaining a third embodiment of the identification information recording method according to the present invention.

Next, a description will be given of a third embodiment of the identification information recording method according to the present invention, by referring to FIG. 6. FIG. 6 is a flow chart for explaining the third embodiment of the identification information recording method. In FIG. 6, those steps which are the same as those corresponding steps in FIG. 4 are designated by the same reference numerals, and a description thereof will be omitted.

In FIG. 6, before carrying out the step S3, a step S31 receives a storage capacity of the optical disk 72. As described above, this embodiment reads the ID part of the loaded optical disk 72 and recognizes the type of the optical disk 72 by the MPU 12 from the intervals of the pits, and the recognition result of the type of the loaded optical disk 72 is notified to the ODC 14. Hence, it is possible to recognize the storage capacity of the optical disk 72 from the recognition result of the type of the loaded optical disk 72. Accordingly, the step S31 receives the storage capacity of the optical disk 72 which is recognized by the MPU 12 based on the recognition result of the type of the loaded optical disk 72 which is recognized by the MPU 12 and stored in the buffer memory 18, for example.

A step S5-3 generates the firmware management number by carrying out an operation such as an addition based on the version number read from the version number memory and the number read from the version number counter, and generates the identification information by carrying out an operation such as an addition based on this firmware management number, the storage capacity of the optical disk 72, and the medium generation consecutive number indicated by the counted value of the medium generation consecutive number counter. In addition, the step S6-3 records, by a known method, the generated identification information in the user area or outside the user area of the optical disk 72 which is used as the portable recording medium.

Of course, the operation which is carried out when generating the firmware management number and the operation which is carried out when generating the identification information are not limited to the addition, and other operations such as a subtraction may be carried out. In addition, the operation which is carried out when generating the firmware management number and the operation which is carried out when generating the identification information need not be the same, and for example, one operation may be an addition and the other operation may be a subtraction.

Figure 7:
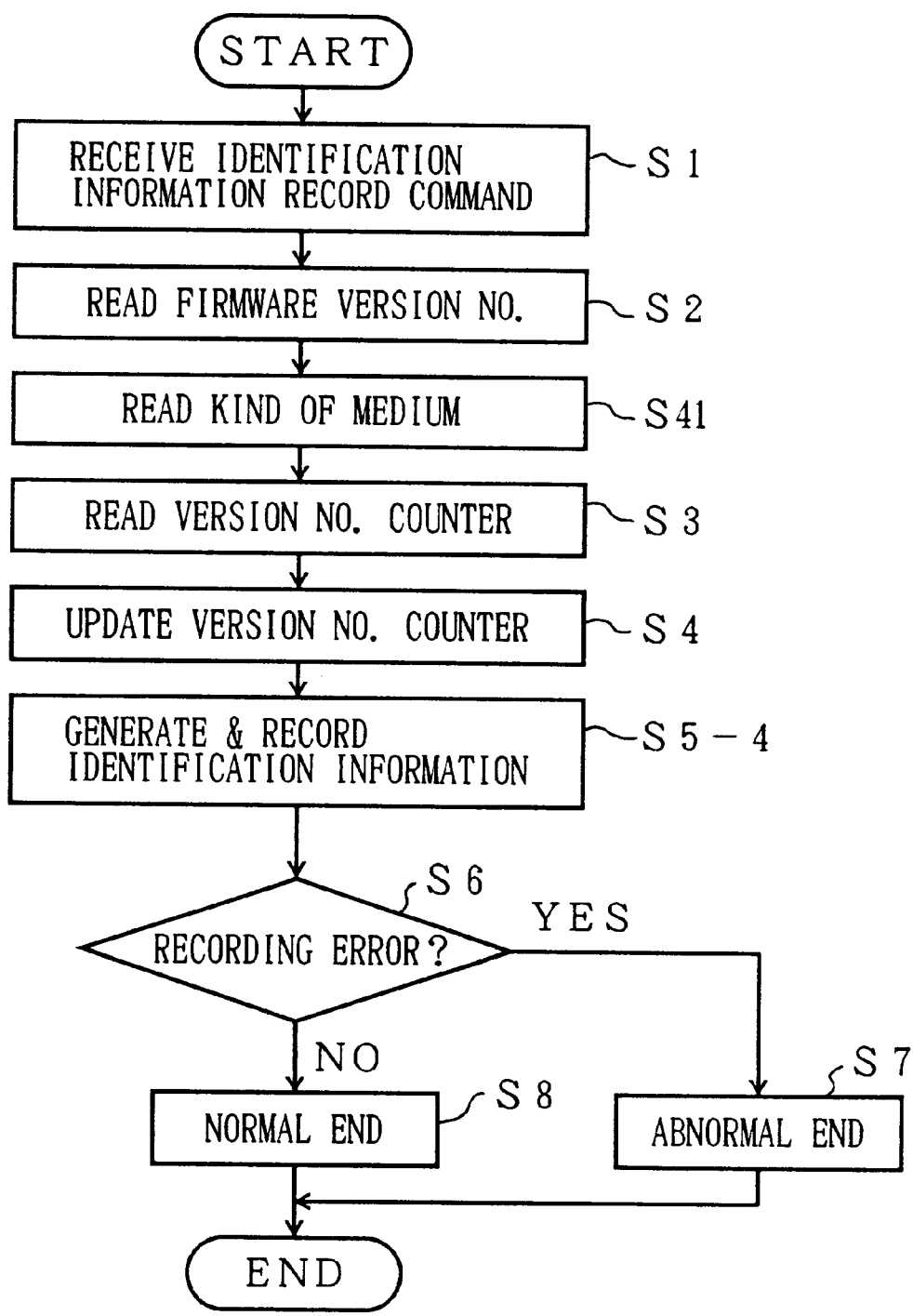
FIG. 7 is a flow chart for explaining a fourth embodiment of the identification information recording method according to the present invention.

Next, a description will be given of a fourth embodiment of the identification information recording method according to the present invention, by referring to FIG. 7. FIG. 7 is a flow chart for explaining the fourth embodiment of the identification information recording method. In FIG. 7, those steps which are the same as those corresponding steps in FIG. 4 are designated by the same reference numerals, and a description thereof will be omitted.

In FIG. 7, before carrying out the step S3, a step S41 receives a medium kind of the optical disk 72. As described above, this embodiment reads the ID part of the loaded optical disk 72 and recognizes the type of the optical disk 72 by the MPU 12 from the intervals of the pits, and the recognition result of the type of the loaded optical disk 72 is notified to the ODC 14. Hence, it is possible to recognize the medium kind of the optical disk 72, that is, that the medium kind is an optical disk in this case, from the recognition result of the type of the loaded optical disk 72. Accordingly, the step S41 receives the medium kind of the optical disk 72 which is recognized by the MPU 12 based on the recognition result of the type of the loaded optical disk 72 which is recognized by the MPU 12 and stored in the buffer memory 18, for example.

A step S5-4 generates the firmware management number by carrying out an operation such as an addition based on the version number read from the version number memory and the number read from the version number counter, and generates the identification information by carrying out an operation such as an addition based on this firmware management number, the medium kind of the optical disk 72, and the medium generation consecutive number indicated by the counted value of the medium generation consecutive number counter. In addition, the step S6-4 records, by a known method, the generated identification information in the user area or outside the user area of the optical disk 72 which is used as the portable recording medium.

Of course, the operation which is carried out when generating the firmware management number and the operation which is carried out when generating the identification information are not limited to the addition, and other operations such as a subtraction may be carried out. In addition, the operation which is carried out when generating the firmware management number and the operation which is carried out when generating the identification information need not be the same, and for example, one operation may be an addition and the other operation may be a subtraction.

Figure 8:
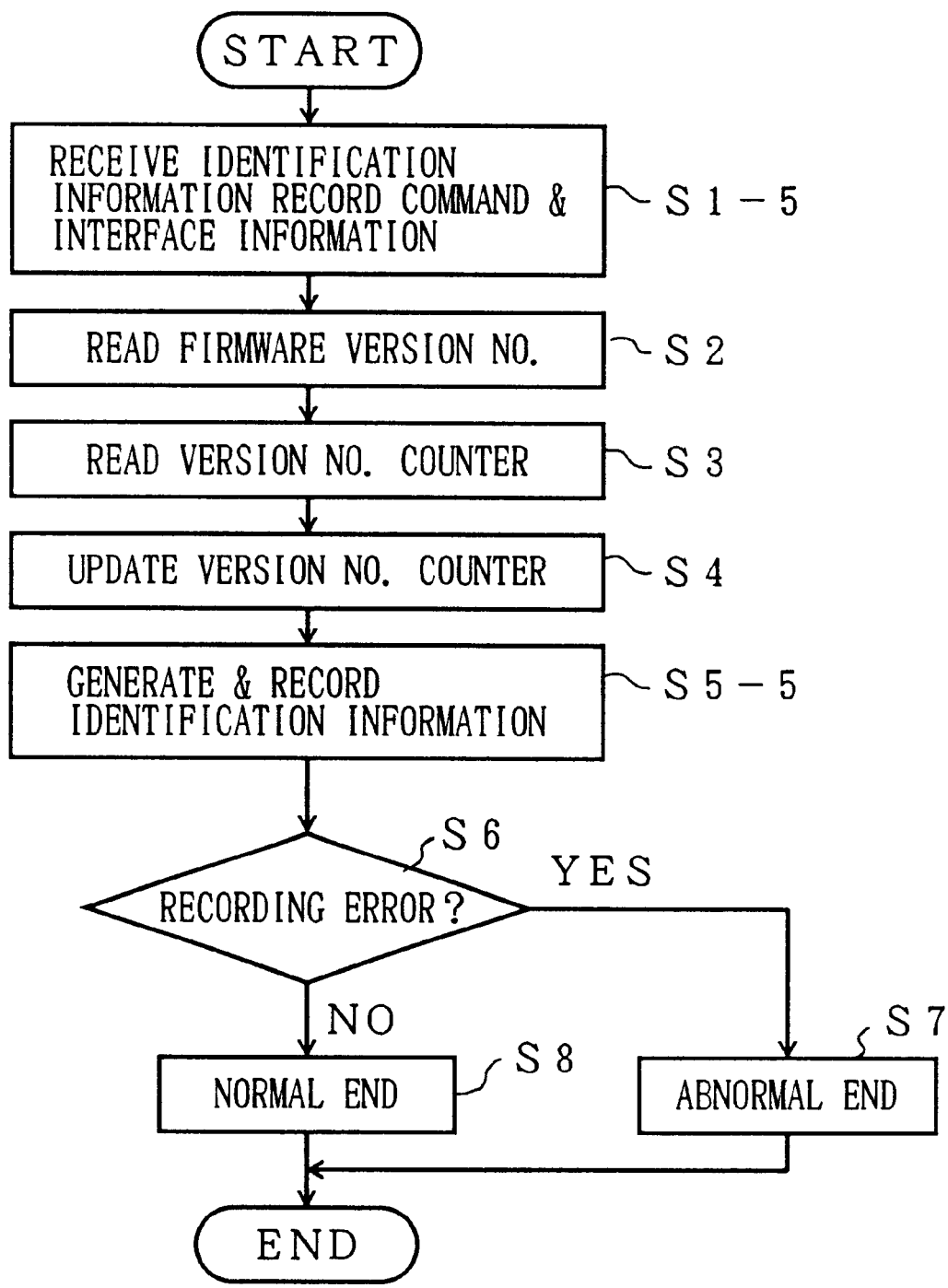
FIG. 8 is a flow chart for explaining a fifth embodiment of the identification information recording method according to the present invention.

Next, a description will be given of a fifth embodiment of the identification information recording method according to the present invention, by referring to FIG. 8. FIG. 8 is a flow chart for explaining the fifth embodiment of the identification information recording method. In FIG. 8, those steps which are the same as those corresponding steps in FIG. 4 are designated by the same reference numerals, and a description thereof will be omitted.

In FIG. 8, a step S1-5 receives used interface information in addition to receiving the identification information record command from the host unit. The used interface information which is related to the kind of interface used by the storage unit may be input in advance by the user and stored in the buffer memory 18, for example, or input when issuing the identification information record command from the host unit. In the former case, the used interface information is received by reading the used interface information from the buffer memory 18. On the other hand, in the latter case, the used interface information is received from the host unit together with the identification information record command.

A step S5-5 generates the firmware management number by carrying out an operation such as an addition based on the version number read from the version number memory and the number read from the version number counter, and generates the identification information by carrying out an operation such as an addition based on this firmware management number, the used interface information and the medium generation consecutive number indicated by the counted value of the medium generation consecutive number counter. In addition, the step S5-5 records, by a known method, the generated identification information in the user area or outside the user area of the optical disk 72 which is used as the portable recording medium.

Of course, the operation which is carried out when generating the firmware management number and the operation which is carried out when generating the identification information are not limited to the addition, and other operations such as a subtraction may be carried out. In addition, the operation which is carried out when generating the firmware management number and the operation which is carried out when generating the identification information need not be the same, and for example, one operation may be an addition and the other operation may be a subtraction.

The first through fifth embodiments of the identification information recording method described above may be combined arbitrarily.

Figure 9:
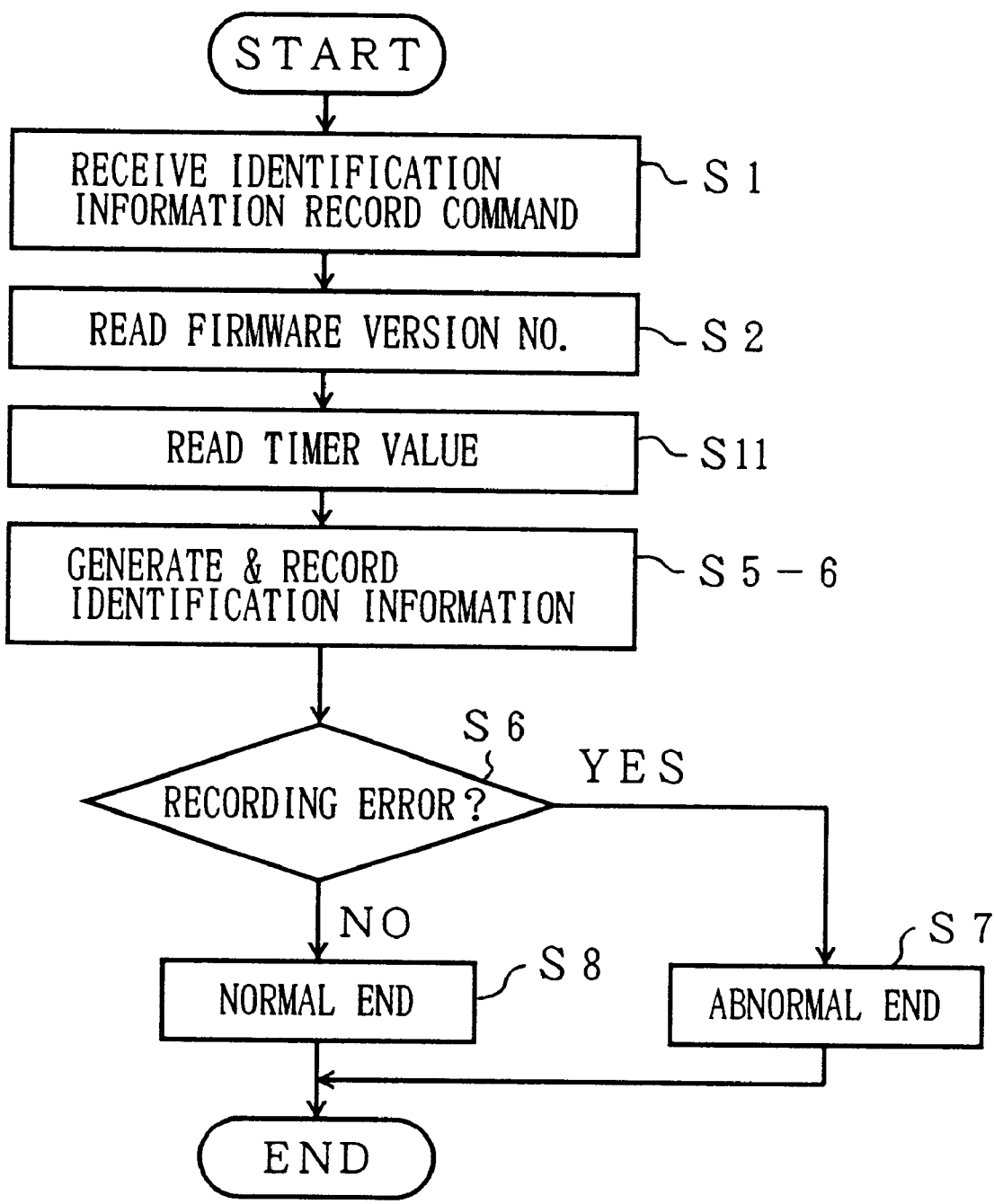
FIG. 9 is a flow chart for explaining a sixth embodiment of the identification information recording method according to the present invention.

Next, a description will be given of a sixth embodiment of the identification information recording method according to the present invention, by referring to FIG. 9. FIG. 9 is a flow chart for explaining the sixth embodiment of the identification information recording method. In FIG. 9, those steps which are the same as those corresponding steps in FIG. 4 are designated by the same reference numerals, and a description thereof will be omitted.

In FIG. 9, after the step S2, a step S11 reads a timer value from a timer within the MPU 12. This timer value indicates the year, month, day and time, for example, and it is possible to known from this timer value the year, month, day and time when the identification information is recorded on the optical disk 72.

A step S5-6 generates the firmware management number by carrying out an operation such as an addition based on the version number read from the version number memory and the number read from the version number counter, and generates the identification information by carrying out an operation such as an addition based on this firmware management number and the timer value. In addition, the step S5-6 records, by a known method, the generated identification information in the user area or outside the user area of the optical disk 72 which is used as the portable recording medium.

Of course, the operation which is carried out when generating the firmware management number and the operation which is carried out when generating the identification information are not limited to the addition, and other operations such as a subtraction may be carried out. In addition, the operation which is carried out when generating the firmware management number and the operation which is carried out when generating the identification information need not be the same, and for example, one operation may be an addition and the other operation may be a subtraction.

Figure 10:
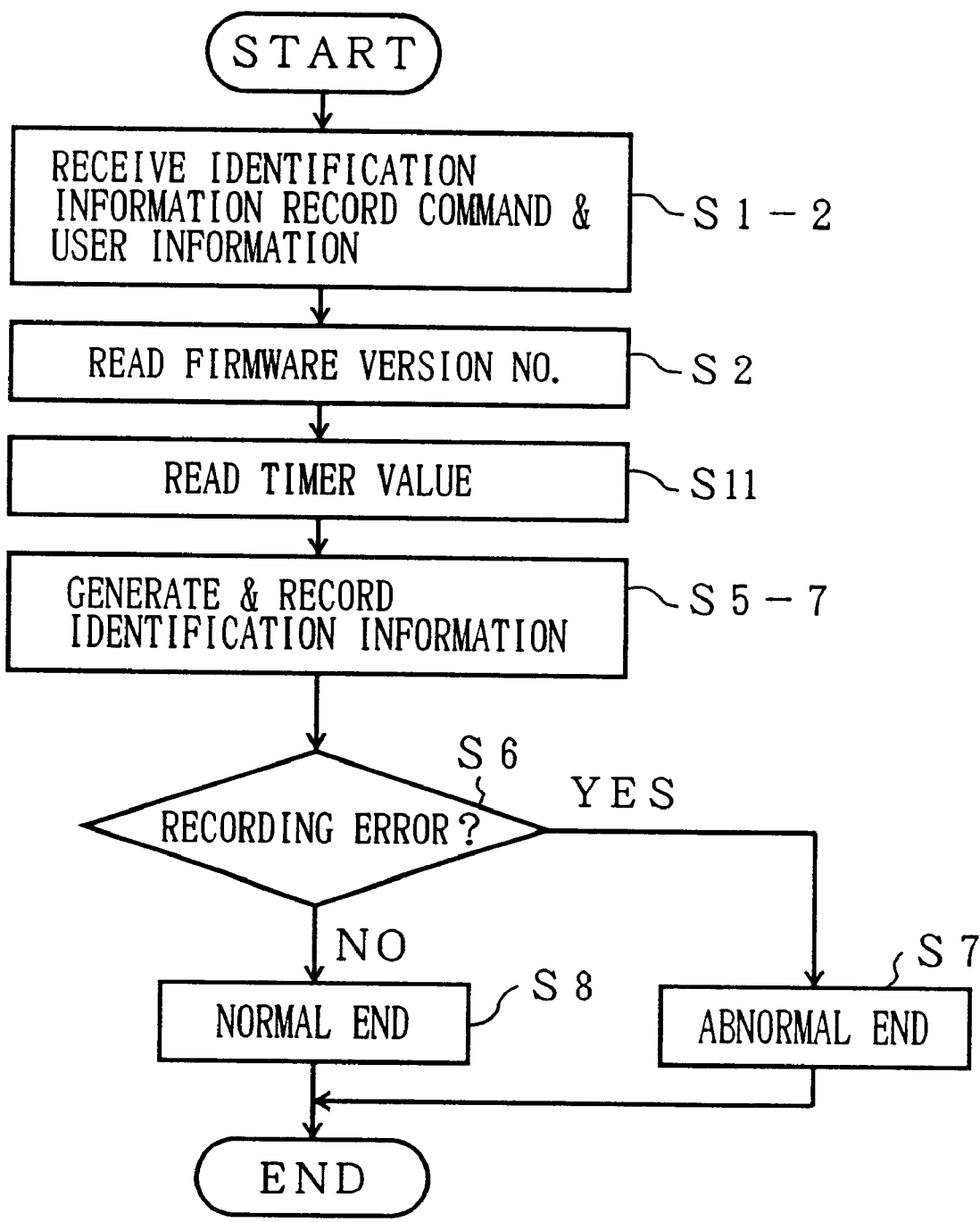
FIG. 10 is a flow chart for explaining a seventh embodiment of the identification information recording method according to the present invention.

Next, a description will be given of a seventh embodiment of the identification information recording method according to the present invention, by referring to FIG. 10. FIG. 10 is a flow chart for explaining the seventh embodiment of the identification information recording method. In FIG. 10, those steps which are the same as those corresponding steps in FIGS. 4, 5 and 9 are designated by the same reference numerals, and a description thereof will be omitted.

In FIG. 10, a step S5-7 generates the firmware management number by carrying out an operation such as an addition based on the version number read from the version number memory and the number read from the version number counter, and generates the identification information by carrying out an operation such as an addition based on this firmware management number, the user information and the timer value. In addition, the step S5-7 records, by a known method, the generated identification information in the user area or outside the user area of the optical disk 72 which is used as the portable recording medium.

Of course, the operation which is carried out when generating the firmware management number and the operation which is carried out when generating the identification information are not limited to the addition, and other operations such as a subtraction may be carried out. In addition, the operation which is carried out when generating the firmware management number and the operation which is carried out when generating the identification information need not be the same, and for example, one operation may be an addition and the other operation may be a subtraction.

Figure 11:
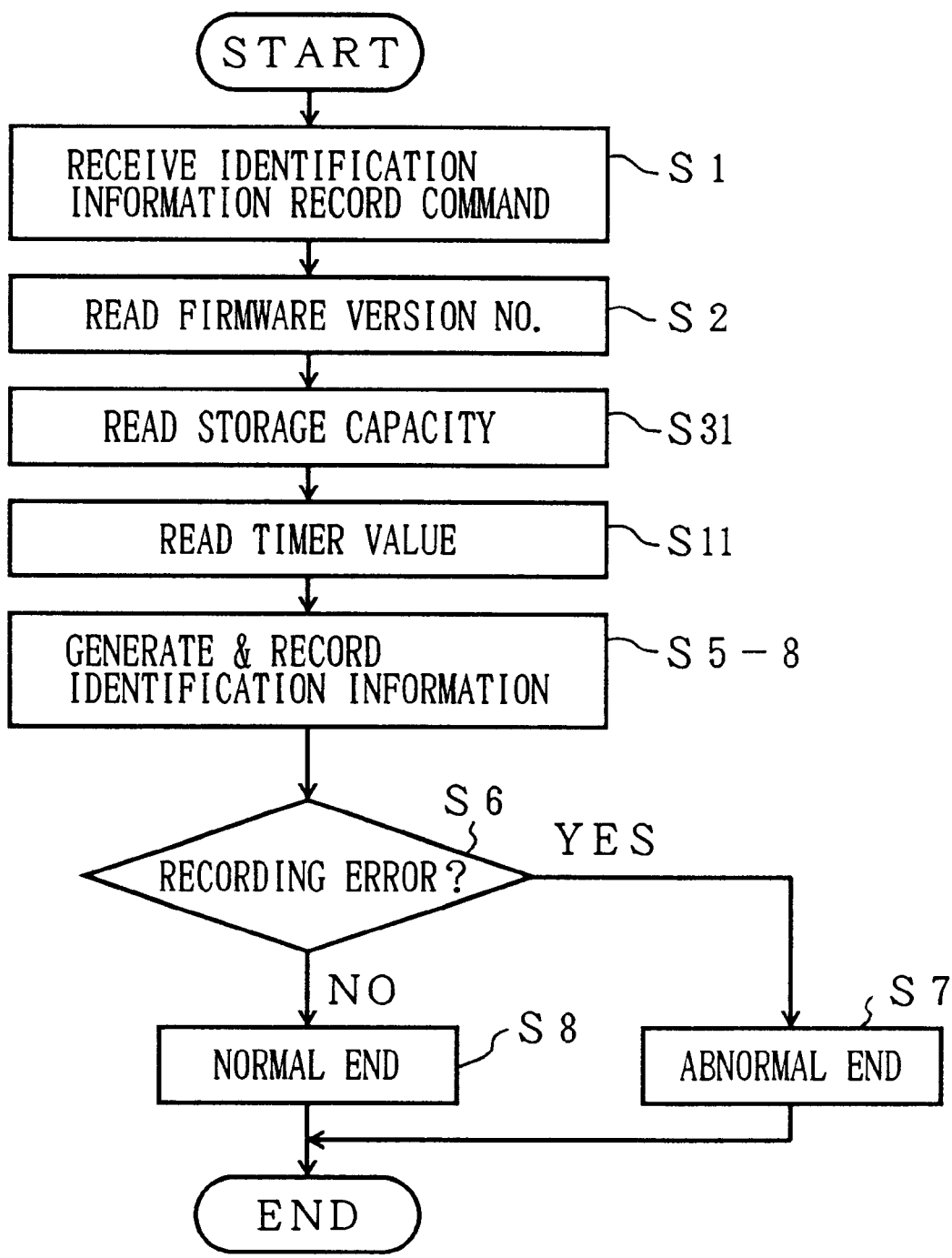
FIG. 11 is a flow chart for explaining an eighth embodiment of the identification information recording method according to the present invention.

Next, a description will be given of an eighth embodiment of the identification information recording method according to the present invention, by referring to FIG. 11. FIG. 11 is a flow chart for explaining the eighth embodiment of the identification information recording method. In FIG. 11, those steps which are the same as those corresponding steps in FIGS. 4, 6 and 9 are designated by the same reference numerals, and a description thereof will be omitted.

In FIG. 11, a step S5-8 generates the firmware management number by carrying out an operation such as an addition based on the version number read from the version number memory and the number read from the version number counter, and generates the identification information by carrying out an operation such as an addition based on this firmware management number, the storage capacity of the optical disk 72 and the timer value. In addition, the step S5-8 records, by a known method, the generated identification information in the user area or outside the user area of the optical disk 72 which is used as the portable recording medium.

Of course, the operation which is carried out when generating the firmware management number and the operation which is carried out when generating the identification information are not limited to the addition, and other operations such as a subtraction may be carried out. In addition, the operation which is carried out when generating the firmware management number and the operation which is carried out when generating the identification information need not be the same, and for example, one operation may be an addition and the other operation may be a subtraction.

Figure 12:
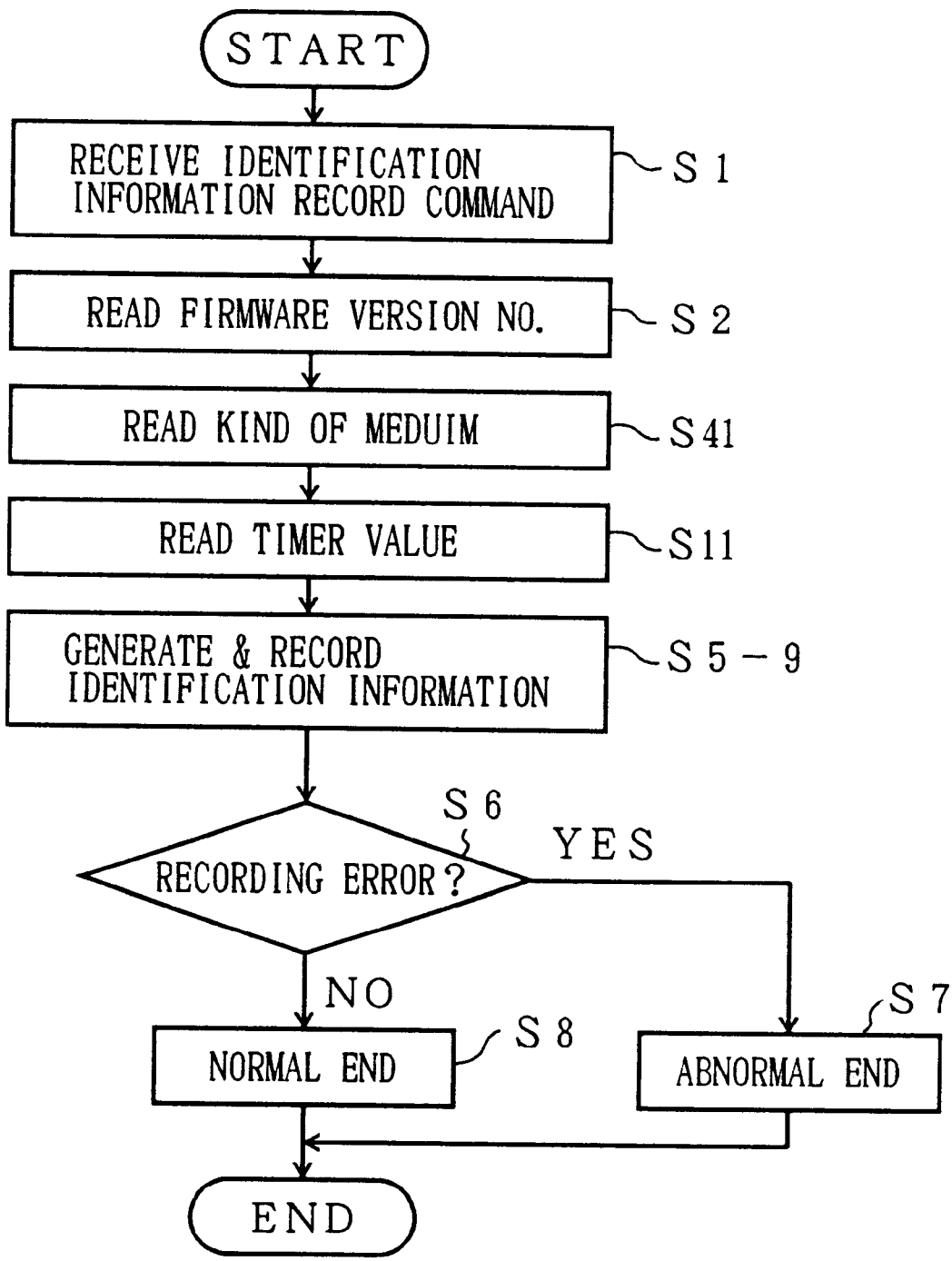
FIG. 12 is a flow chart for explaining a ninth embodiment of the identification information recording method according to the present invention.

Next, a description will be given of a ninth embodiment of the identification information recording method according to the present invention, by referring to FIG. 12. FIG. 12 is a flow chart for explaining the ninth embodiment of the identification information recording method. In FIG. 12, those steps which are the same as those corresponding steps in FIGS. 4, 7 and 9 are designated by the same reference numerals, and a description thereof will be omitted.

In FIG. 12, a step S5-9 generates the firmware management number by carrying out an operation such as an addition based on the version number read from the version number memory and the number read from the version number counter, and generates the identification information by carrying out an operation such as an addition based on this firmware management number, the medium kind and the timer value. In addition, the step S5-9 records, by a known method, the generated identification information in the user area or outside the user area of the optical disk 72 which is used as the portable recording medium.

Of course, the operation which is carried out when generating the firmware management number and the operation which is carried out when generating the identification information are not limited to the addition, and other operations such as a subtraction may be carried out. In addition, the operation which is carried out when generating the firmware management number and the operation which is carried out when generating the identification information need not be the same, and for example, one operation may be an addition and the other operation may be a subtraction.

Figure 13:
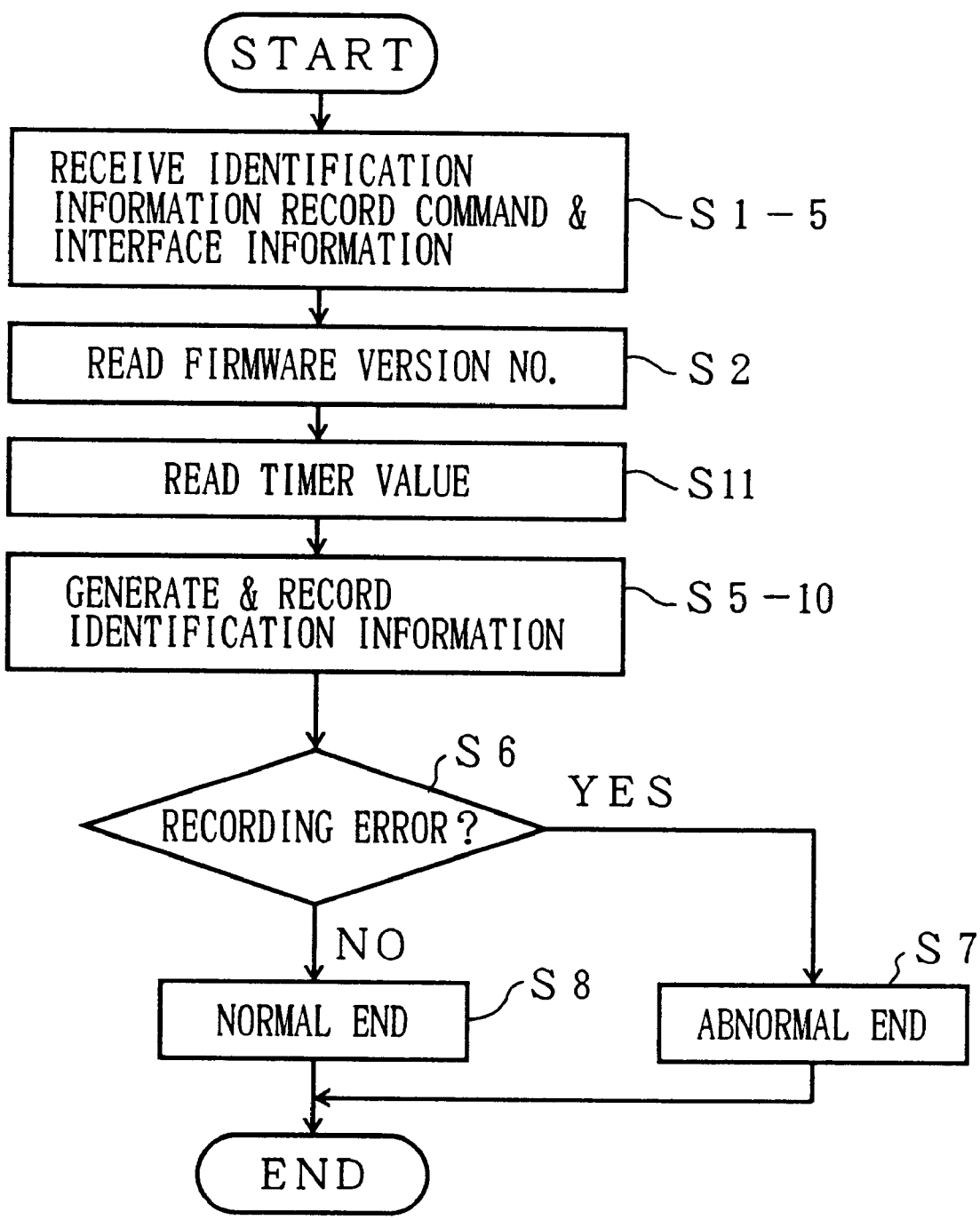
FIG. 13 is a flow chart for explaining a tenth embodiment of the identification information recording method according to the present invention.

Next, a description will be given of a tenth embodiment of the identification information recording method according to the present invention, by referring to FIG. 13. FIG. 13 is a flow chart for explaining the tenth embodiment of the identification information recording method. In FIG. 13, those steps which are the same as those corresponding steps in FIGS. 4, 8 and 9 are designated by the same reference numerals, and a description thereof will be omitted.

In FIG. 13, a step S5-10 generates the firmware management number by carrying out an operation such as an addition based on the version number read from the version number memory and the number read from the version number counter, and generates the identification information by carrying out an operation such as an addition based on this firmware management number, the used interface information and the timer value. In addition, the step S5-10 records, by a known method, the generated identification information in the user area or outside the user area of the optical disk 72 which is used as the portable recording medium.

Of course, the operation which is carried out when generating the firmware management number and the operation which is carried out when generating the identification information are not limited to the addition, and other operations such as a subtraction may be carried out. In addition, the operation which is carried out when generating the firmware management number and the operation which is carried out when generating the identification information need not be the same, and for example, one operation may be an addition and the other operation may be a subtraction.

The sixth through tenth embodiments of the identification information recording method described above may be combined arbitrarily.

Figure 14:
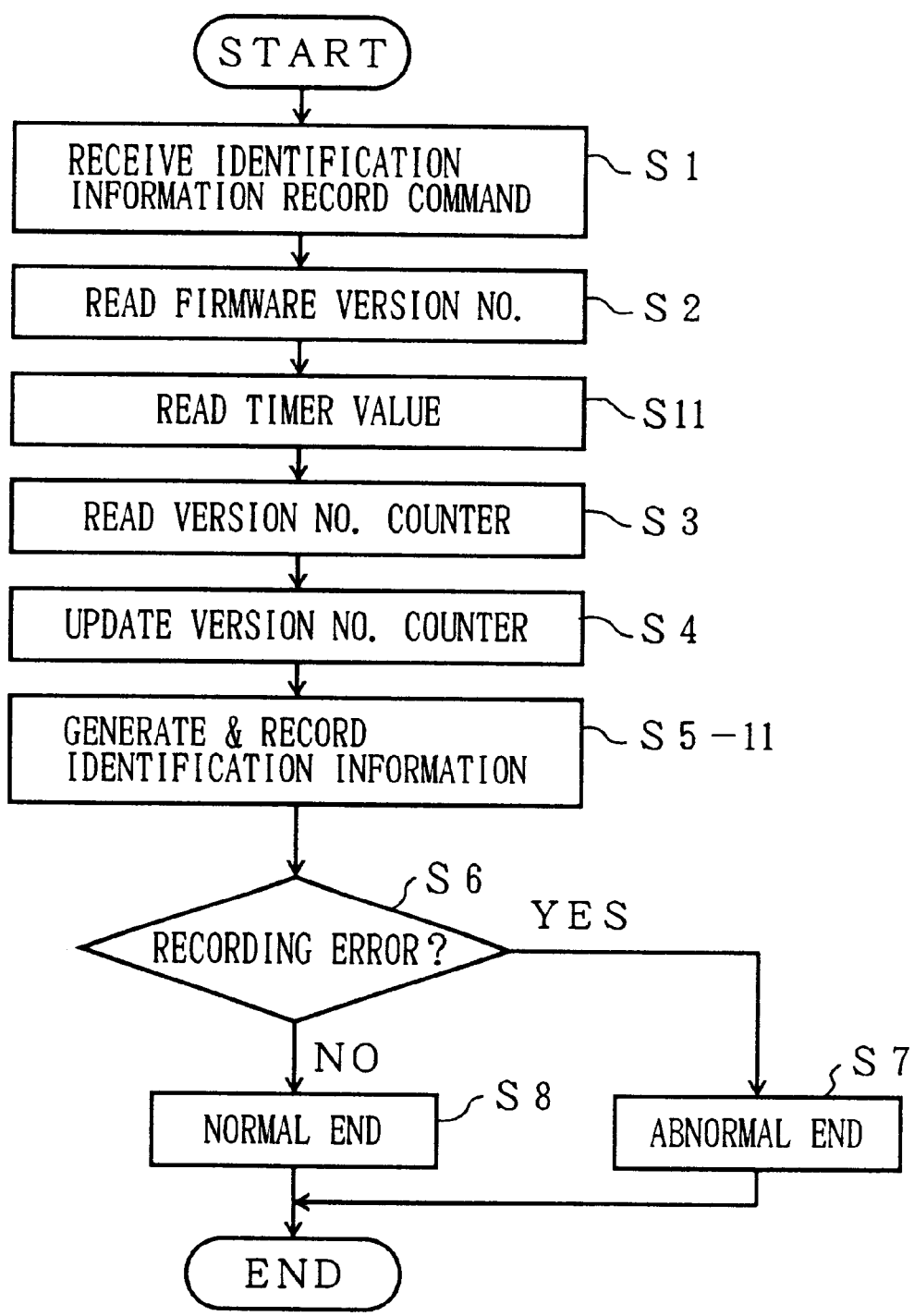
FIG. 14 is a flow chart for explaining an eleventh embodiment of the identification information recording method according to the present invention.

Next, a description will be given of an eleventh embodiment of the identification information recording method according to the present invention, by referring to FIG. 14. FIG. 14 is a flow chart for explaining the eleventh embodiment of the identification information recording method. In FIG. 14, those steps which are the same as those corresponding steps in FIGS. 4 and 9 are designated by the same reference numerals, and a description thereof will be omitted.

In FIG. 14, a step S5-11 generates the firmware management number by carrying out an operation such as an addition based on the version number read from the version number memory and the number read from the version number counter, and generates the identification information by carrying out an operation such as an addition based on this firmware management number, the medium generation consecutive number and the timer value. In addition, the step S5-11 records, by a known method, the generated identification information in the user area or outside the user area of the optical disk 72 which is used as the portable recording medium.

Of course, the operation which is carried out when generating the firmware management number and the operation which is carried out when generating the identification information are not limited to the addition, and other operations such as a subtraction may be carried out. In addition, the operation which is carried out when generating the firmware management number and the operation which is carried out when generating the identification information need not be the same, and for example, one operation may be an addition and the other operation may be a subtraction.

Figure 15:
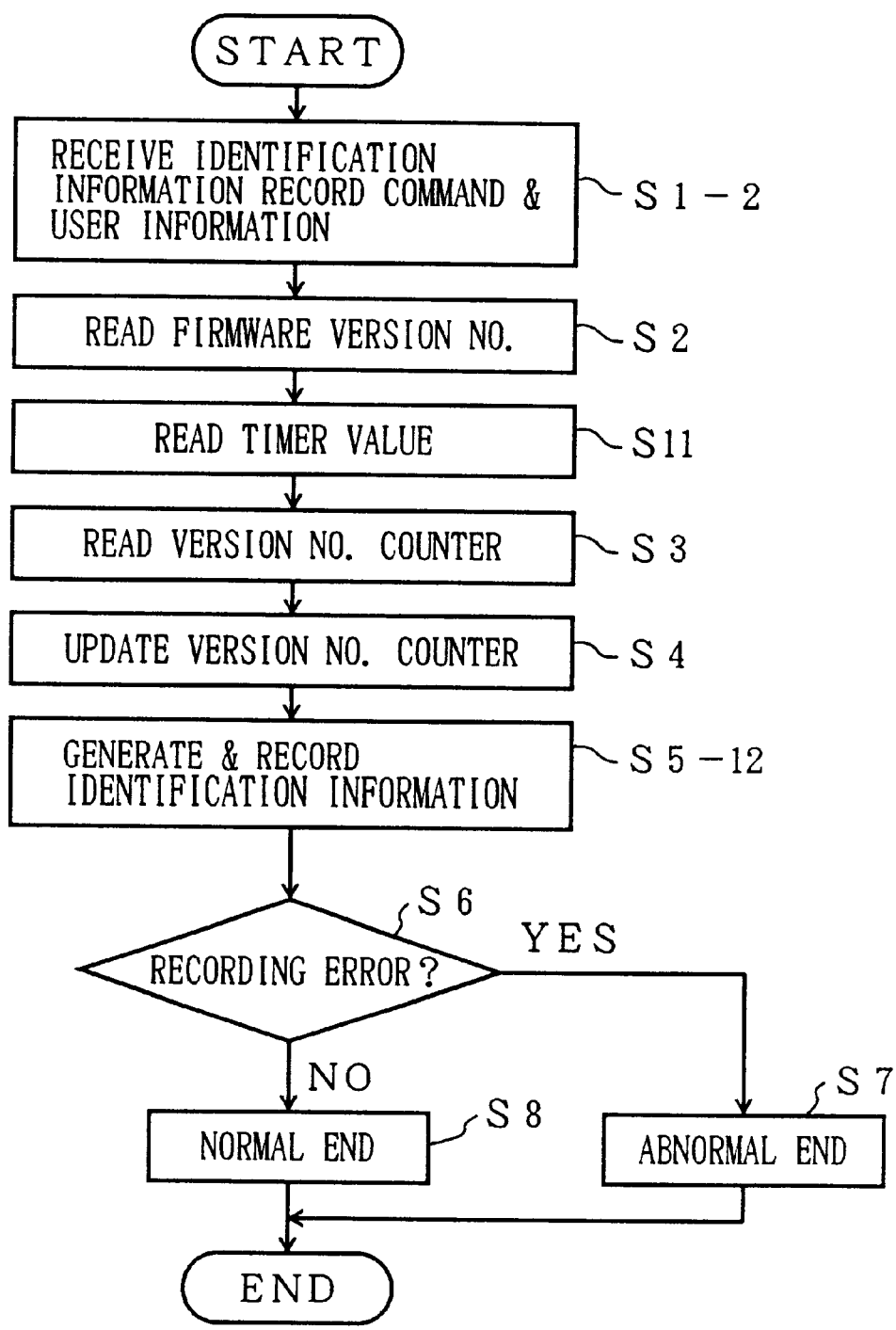
FIG. 15 is a flow chart for explaining a twelfth embodiment of the identification information recording method according to the present invention.

Next, a description will be given of a twelfth embodiment of the identification information recording method according to the present invention, by referring to FIG. 15. FIG. 15 is a flow chart for explaining the twelfth embodiment of the identification information recording method. In FIG. 15, those steps which are the same as those corresponding steps in FIGS. 4, 5 and 9 are designated by the same reference numerals, and a description thereof will be omitted.

In FIG. 15, a step S5-12 generates the firmware management number by carrying out an operation such as an addition based on the version number read from the version number memory and the number read from the version number counter, and generates the identification information by carrying out an operation such as an addition based on this firmware management number, the medium generation consecutive number, the user information and the timer value. In addition, the step S5-12 records, by a known method, the generated identification information in the user area or outside the user area of the optical disk 72 which is used as the portable recording medium.

Of course, the operation which is carried out when generating the firmware management number and the operation which is carried out when generating the identification information are not limited to the addition, and other operations such as a subtraction may be carried out. In addition, the operation which is carried out when generating the firmware management number and the operation which is carried out when generating the identification information need not be the same, and for example, one operation may be an addition and the other operation may be a subtraction.

Figure 16:
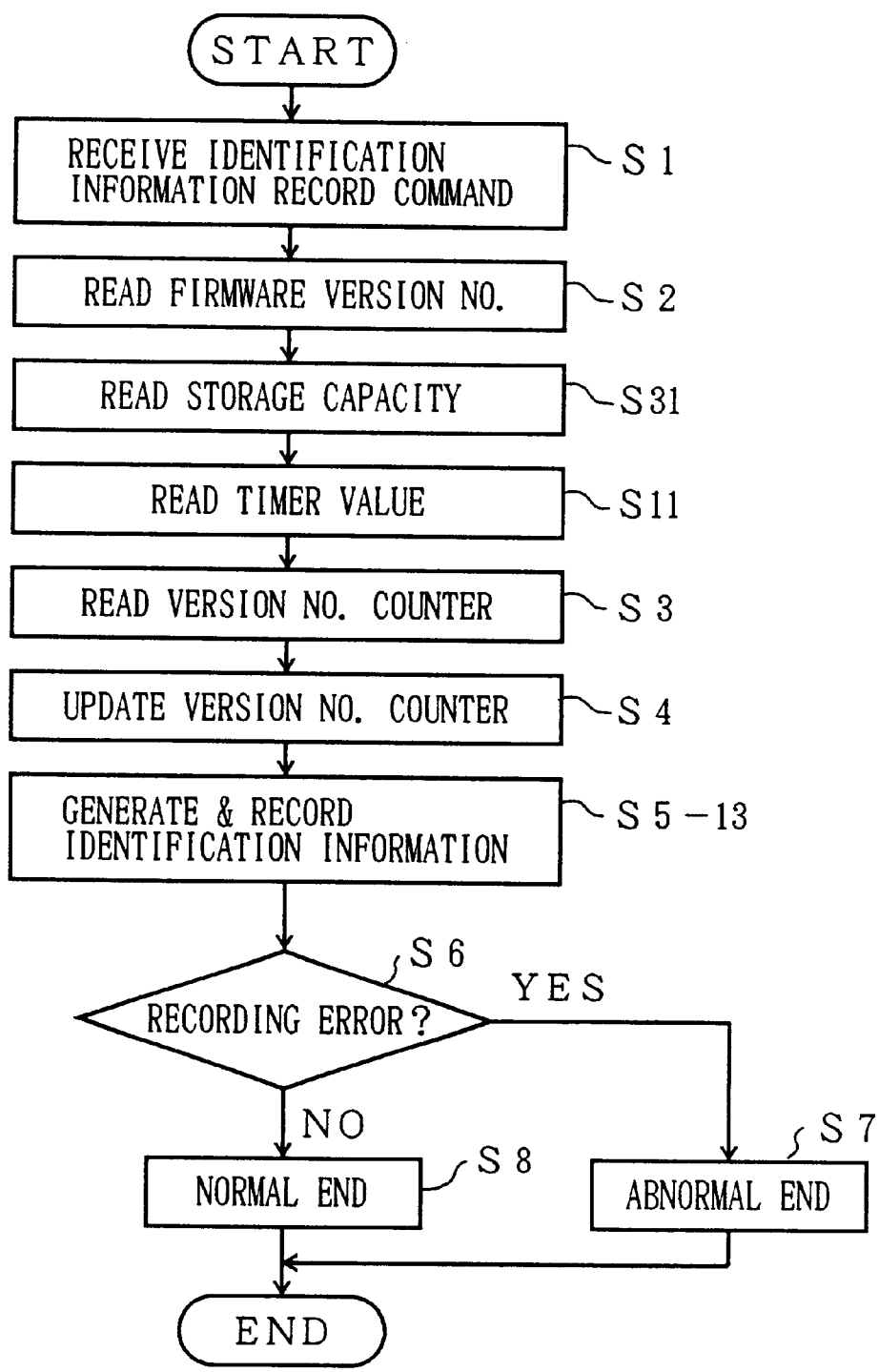
FIG. 16 is a flow chart for explaining a thirteenth embodiment of the identification information recording method according to the present invention.

Next, a description will be given of a thirteenth embodiment of the identification information recording method according to the present invention, by referring to FIG. 16. FIG. 16 is a flow chart for explaining the thirteenth embodiment of the identification information recording method. In FIG. 16, those steps which are the same as those corresponding steps in FIGS. 4, 6 and 9 are designated by the same reference numerals, and a description thereof will be omitted.

In FIG. 16, a step S5-13 generates the firmware management number by carrying out an operation such as an addition based on the version number read from the version number memory and the number read from the version number counter, and generates the identification information by carrying out an operation such as an addition based on this firmware management number, the medium generation consecutive number, the storage capacity of the optical disk 72 and the timer value. In addition, the step S5-13 records, by a known method, the generated identification information in the user area or outside the user area of the optical disk 72 which is used as the portable recording medium.

Of course, the operation which is carried out when generating the firmware management number and the operation which is carried out when generating the identification information are not limited to the addition, and other operations such as a subtraction may be carried out. In addition, the operation which is carried out when generating the firmware management number and the operation which is carried out when generating the identification information need not be the same, and for example, one operation may be an addition and the other operation may be a subtraction.

Figure 17:
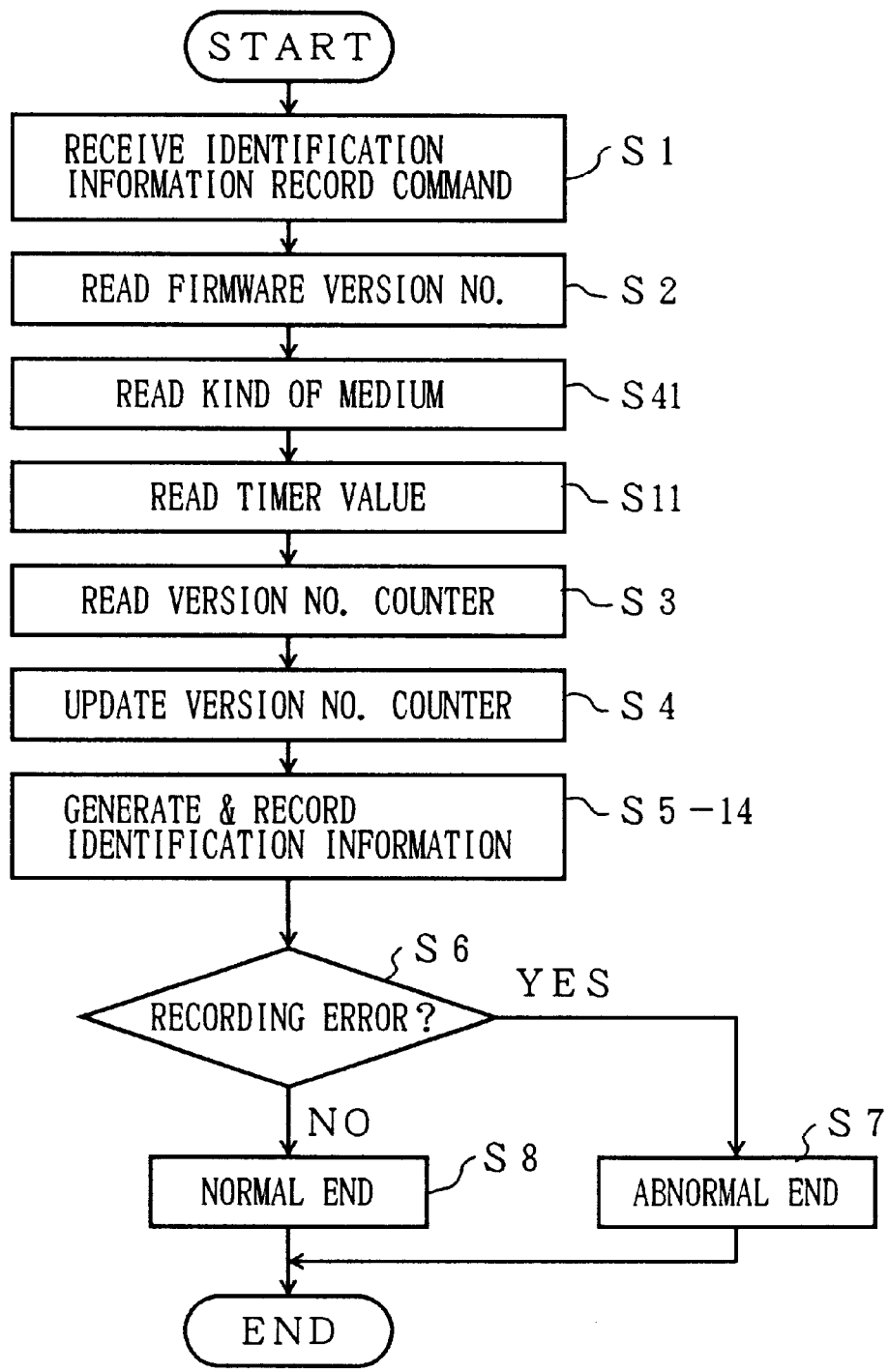
FIG. 17 is a flow chart for explaining a fourteenth embodiment of the identification information recording method according to the present invention.

Next, a description will be given of a fourteenth embodiment of the identification information recording method according to the present invention, by referring to FIG. 17. FIG. 17 is a flow chart for explaining the fourteenth embodiment of the identification information recording method. In FIG. 17, those steps which are the same as those corresponding steps in FIGS. 4, 7 and 9 are designated by the same reference numerals, and a description thereof will be omitted.

In FIG. 17, a step S5-14 generates the firmware management number by carrying out an operation such as an addition based on the version number read from the version number memory and the number read from the version number counter, and generates the identification information by carrying out an operation such as an addition based on this firmware management number, the medium generation consecutive number, the medium kind and the timer value. In addition, the step S5-14 records, by a known method, the generated identification information in the user area or outside the user area of the optical disk 72 which is used as the portable recording medium.

Of course, the operation which is carried out when generating the firmware management number and the operation which is carried out when generating the identification information are not limited to the addition, and other operations such as a subtraction may be carried out. In addition, the operation which is carried out when generating the firmware management number and the operation which is carried out when generating the identification information need not be the same, and for example, one operation may be an addition and the other operation may be a subtraction.

Figure 18:
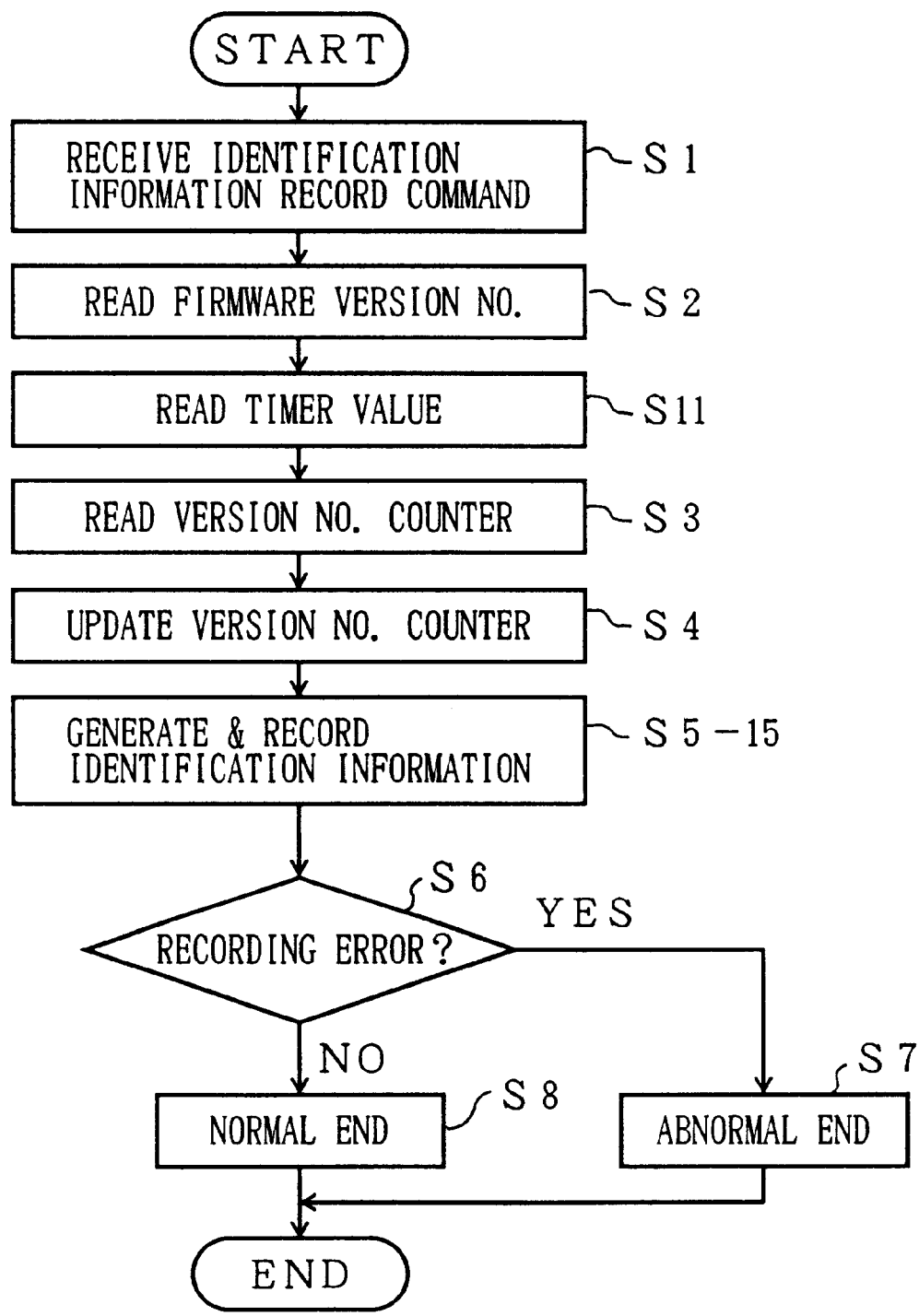
FIG. 18 is a flow chart for explaining a fifteenth embodiment of the identification information recording method according to the present invention.

Next, a description will be given of a fifteenth embodiment of the identification information recording method according to the present invention, by referring to FIG. 18. FIG. 18 is a flow chart for explaining the fifteenth embodiment of the identification information recording method. In FIG. 18, those steps which are the same as those corresponding steps in FIGS. 4, 8 and 9 are designated by the same reference numerals, and a description thereof will be omitted.

In FIG. 18, a step S5-15 generates the firmware management number by carrying out an operation such as an addition based on the version number read from the version number memory and the number read from the version number counter, and generates the identification information by carrying out an operation such as an addition based on this firmware management number, the medium generation consecutive number, the used interface information and the timer value. In addition, the step S5-15 records, by a known method, the generated identification information in the user area or outside the user area of the optical disk 72 which is used as the portable recording medium.

Of course, the operation which is carried out when generating the firmware management number and the operation which is carried out when generating the identification information are not limited to the addition, and other operations such as a subtraction may be carried out. In addition, the operation which is carried out when generating the firmware management number and the operation which is carried out when generating the identification information need not be the same, and for example, one operation may be an addition and the other operation may be a subtraction.

The eleventh through fifteenth embodiments of the identification information recording method described above may be combined arbitrarily.

In each of the embodiments described above, the identification information is recorded in response to the identification information record command from the host unit. However, since the identification information record command is issued from the host unit at an arbitrary time, the identification information is recorded automatically on the user side at an arbitrary time in response to the identification information record command. For example, when the host unit issues a format command so as to format the optical disk 72, it is possible to design the MPU 12 to recognize this format command as the identification information record command so that the identification information is recorded automatically at the time of the formatting on the user side.

In addition, in the embodiments described above, the storage unit is described as being made up of the control unit 10 and the enclosure 11, and not including the host unit. However, the storage unit may be constructed to include the host unit. In the former case, the firmware is installed in the control unit 10, but the firmware is installed within a control unit of the host unit in the latter case. In other words, a program for making the firmware and a computer record on the portable recording medium the identification information which is peculiar to the portable recording medium may be installed in the computer of the storage unit or the host unit, such as the control unit 10.

In each of the embodiments described above, the identification information is recorded on the optical disk. However, the portable recording medium is not limited to the optical disk 72, and the present invention is similarly applicable to any portable recording medium, such as various kinds of disks including magnetic disks, optical disks and magneto-optic disks, and memory cards.

Further, the present invention is not limited to these embodiments, but various variations and modifications may be made without departing from the scope of the present invention.

What is claimed is:

1. A storage unit for recording on a portable recording medium identification information, comprising:

a number generation unit generating a firmware management number based on a version number of a firmware of the storage unit and a number of times said firmware has been installed in the storage unit;

an information generation unit generating the identification information based on at least a medium generation consecutive number which indicates a number of times the identification information is recorded on portable recording media and said firmware management number; and a recording unit recording the identification information on the portable recording medium, wherein the identification information recorded on the portable recording medium is peculiar to the portable recording medium for independently managing the portable recording medium.

2. The storage unit as claimed in claim 1, wherein said information generation unit generates the identification information based on said medium generation consecutive number, said firmware management number, and user information.

3. The storage unit as claimed in claim 1, wherein said information generation unit generates the identification information based on said medium generation consecutive number, said firmware management number, and storage capacity information which indicates a storage capacity of the portable recording medium.

4. The storage unit as claimed in claim 1, wherein said information generation unit generates the identification information based on said medium generation consecutive number, said firmware management number, and kind information which indicates a kind of the portable recording medium.

5. The storage unit as claimed in claim 1, wherein said information generation unit generates the identification information based on said medium generation consecutive number, said firmware management number, and kind information which indicates a kind of interface used by the storage unit.

6. The storage unit as claimed in claim 1, wherein said information generation unit generates the identification information based on said medium generation consecutive number, said firmware management number, and time information which indicates a time when the portable recording medium is created.

7. A storage unit for recording on a portable recording medium identification information, comprising:

a number generation unit generating a firmware management number based on a version number of a firmware of the storage unit and a number of times said firmware has been installed in the storage unit;

an information generation unit generating the identification information based on at least time information which indicates a time when the portable recording medium is created and said firmware management number; and a recording unit recording the identification information on the portable recording medium, wherein the identification information recorded on the portable recording medium is peculiar to the portable recording medium for independently managing the portable recording medium.

8. The storage unit as claimed in claim 7, wherein said information generation unit generates the identification information based on said time information, said firmware management number, and user information.

9. The storage unit as claimed in claim 7, wherein said information generation unit generates the identification information based on said time information, said firmware management number, and storage capacity information which indicates a storage capacity of the portable recording medium.

10. The storage unit as claimed in claim 7, wherein said information generation unit generates the identification information based on said time information, said firmware management number, and kind information which indicates a kind of the portable recording medium.

11. The storage unit as claimed in claim 7, wherein said information generation unit generates the identification information based on said time information, said firmware management number, and kind information which indicates a kind of interface used by the storage unit.

12. A computer readable storage medium which stores a program for causing a computer to record on a portable recording medium identification information, comprising:

number generation means for causing the computer to generate a firmware management number based on a version number of a firmware of the computer and a number of times said firmware has been installed in the computer;

information generation means for causing the computer to generate the identification information based on at least a medium generation consecutive number which indicates a number of times the identification information is recorded on portable recording media and said firmware management number; and recording means for causing the computer to record the identification information on the portable recording medium, wherein the identification information recorded on the portable recording medium is peculiar to the portable recording medium for independently managing the portable recording medium.

13. The storage medium as claimed in claim 12, wherein said information generation means causes the computer to generate the identification information based on said medium generation consecutive number, said firmware management number, and user information.

14. The storage medium as claimed in claim 12, wherein said information generation means causes the computer to generate the identification information based on said medium generation consecutive number, said firmware management number, and storage capacity information which indicates a storage capacity of the portable recording medium.

15. The storage medium as claimed in claim 12, wherein said information generation means causes the computer to generate the identification information based on said medium generation consecutive number, said firmware management number, and kind information which indicates a kind of the portable recording medium.

16. The storage medium as claimed in claim 12, wherein said information generation means causes the computer to generate the identification information based on said medium generation consecutive number, said firmware management number, and kind information which indicates a kind of interface used by the computer.

17. The storage medium as claimed in claim 12, wherein said information generation means causes the computer to generate the identification information based on said medium generation consecutive number, said firmware management number, and time information which indicates a time when the portable recording medium is created.

18. A computer readable storage medium which stores a program for causing a computer to record on a portable recording medium identification information, comprising:

number generation means for causing the computer to generate a firmware management number based on a version number of a firmware of the computer and a number of times said firmware has been installed in the computer;

information generation means for causing the computer to generate the identification information based on at least time information which indicates a time when the portable recording medium is created and said firmware management number; and recording means for causing the computer to record the identification information on the portable recording medium, wherein the identification information recorded on the portable recording medium is peculiar to the portable recording medium for independently managing the portable recording medium.

19. The storage medium as claimed in claim 18, wherein said information generation means causes the computer to generate the identification information based on said time information, said firmware management number, and user information.

20. The storage medium as claimed in claim 18, wherein said information generation means causes the computer to generate the identification information based on said time information, said firmware management number, and storage capacity information which indicates a storage capacity of the portable recording medium.

21. The storage medium as claimed in claim 18, wherein said information generation means causes the computer to generate the identification information based on said time information, said firmware a kind of the portable recording medium.

22. The storage medium as claimed in claim 18, wherein said information generation means causes the computer to generate the identification information based on said time information, said firmware management number, and kind information which indicates a kind of interface used by the computer.

23. An identification information recording method for recording on a portable recording medium used by a computer identification information, comprising:

a number generation process generating a firmware management number based on a version number of a firmware of the computer and a number of times said firmware is installed in past in the computer;

an information generation process generating the identification information based on at least a medium generation consecutive number which indicates a number of times the identification information is recorded on portable recording mediums and said firmware management number; and a recording process recording the identification information on the portable recording medium, wherein the identification information recorded on the portable recording medium is peculiar to the portable recording medium for independently managing the portable recording medium.

24. The identification information recording method claimed in claim 23, wherein said information generation process generates the identification information based on said medium generation consecutive number, said firmware management number, and user information.

25. The identification information recording method as claimed in claim 23, wherein said information generation process generates the identification information based on said medium generation consecutive number, said firmware management number, and storage capacity information which indicates a storage capacity of the portable recording medium.

26. The identification information recording method as claimed in claim 23, wherein said information generation process generates the identification information based on said medium generation consecutive number, said firmware management number, and kind information which indicates a kind of the portable recording medium.

27. The identification information recording method as claimed in claim 23, wherein said information generation process generates the identification information based on said medium generation consecutive number, said firmware management number, and kind information which indicates a kind of interface used by the computer.

28. The identification information recording method as claimed in claim 23, wherein said information generation process generates the identification information based on said medium generation consecutive number, said firmware management number, and time information which indicates a time when the portable recording medium is created.

29. An identification information recording method for recording on a portable recording medium used by a computer identification information, comprising:

a number generation process generating a firmware management number based on a version number of a firmware of the computer and a number of times the firmware is installed in past in the computer;

an information generation process generating the identification information based on at least time information which indicates a time when the portable recording medium is created and said firmware management number; and a recording process recording the identification information on the portable recording medium, wherein the identification information recorded on the portable recording medium is peculiar to the portable recording medium for independently managing the portable recording medium.

30. The identification information recording method as claimed in claim 29, wherein said information generation process generates the identification information based on said time information, said firmware management number, and user information.

31. The identification information recording method as claimed in claim 29, wherein said information generation process generates the identification information based on said time information, said firmware management number, and storage capacity information which indicates a storage capacity of the portable recording medium.

32. The identification information recording method as claimed in claim 29, wherein said information generation process generates the identification information based on said time information, said firmware management number, and kind information which indicates a kind of the portable recording medium.

33. The identification information recording method as claimed in claim 29, wherein said information generation process generates the identification information based on said time information, said firmware management number, and kind information which indicates a kind of interface used by the computer.

* * * * *

UNITED STATES PATENT AND TRADEMARK OFFICE
CERTIFICATE OF CORRECTION

PATENT NO.    : 6,345,385 B2                                                Page 1 of 1
DATED         : February 5, 2002
INVENTOR(S)   : Imamura et al.

It is certified that error appears in the above-identified patent and that said Letters Patent is hereby corrected as shown below:

<u>Title page,</u>
Item [75], Inventors, "Teruhi Yamakawa", delete "Kanagawa" and insert
-- Yokohama -- therefore.

Signed and Sealed this

Twenty-ninth Day of October, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,345,385 B2
DATED : February 5, 2002
INVENTOR(S) : Imamura et al.

It is certified that error appears in the above-identified patent and that said Letters Patent is hereby corrected as shown below:

<u>Title page,</u>
Item [75], Inventors, "Teruji Yamakawa", delete "Kanagawa" and insert
-- Yokohama -- therefore.

This certificate supersedes Certificate of Correction issued October 29, 2002.

Signed and Sealed this

Twenty-ninth Day of April, 2003

JAMES E. ROGAN
*Director of the United States Patent and Trademark Office*